US010368285B2

(12) United States Patent
Cariou et al.

(10) Patent No.: US 10,368,285 B2
(45) Date of Patent: Jul. 30, 2019

(54) STATION (STA), ACCESS POINT (AP) AND METHOD OF COMMUNICATION IN THE PRESENCE OF SPATIAL REUSE

(71) Applicant: Intel IP Corporation, Santa Clara, CA (US)

(72) Inventors: Laurent Cariou, Portland, OR (US); Po-Kai Huang, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 42 days.

(21) Appl. No.: 15/468,368

(22) Filed: Mar. 24, 2017

(65) Prior Publication Data

US 2018/0084472 A1    Mar. 22, 2018

Related U.S. Application Data

(60) Provisional application No. 62/397,408, filed on Sep. 21, 2016.

(51) Int. Cl.
| | |
|---|---|
| *H04W 36/30* | (2009.01) |
| *H04B 17/318* | (2015.01) |
| *H04W 16/14* | (2009.01) |
| *H04W 84/12* | (2009.01) |
| *H04W 36/00* | (2009.01) |

(52) U.S. Cl.
CPC .......... *H04W 36/30* (2013.01); *H04B 17/318* (2015.01); *H04W 16/14* (2013.01); *H04W 36/0055* (2013.01); *H04W 84/12* (2013.01)

(58) Field of Classification Search
CPC ... H04W 36/30; H04W 36/009; H04W 16/14; H04W 84/12; H04B 17/318

USPC .................................................. 370/332, 329
See application file for complete search history.

(56) References Cited

U.S. PATENT DOCUMENTS

| | | | |
|---|---|---|---|
| 2014/0185468 A1* | 7/2014 | Park ..................... | H04W 48/16 370/252 |
| 2016/0037537 A1* | 2/2016 | Xie ..................... | H04W 72/082 370/329 |
| 2016/0381688 A1* | 12/2016 | Hedayat .................. | H04L 27/26 370/329 |
| 2017/0311329 A1* | 10/2017 | Barriac ............. | H04W 72/0493 |
| 2017/0325254 A1* | 11/2017 | Zhou .................... | H04B 7/2656 |
| 2018/0124832 A1* | 5/2018 | Kwon ............... | H04W 74/0808 |

* cited by examiner

*Primary Examiner* — Kwang B Yao
*Assistant Examiner* — Syed M Bokhari
(74) *Attorney, Agent, or Firm* — Schwegman Lundberg & Woessner, P.A.

(57) ABSTRACT

Embodiments of a station (STA), access point (AP) and method for communication in the presence of spatial reuse (SR) transmissions are generally described herein. An STA may determine a received signal strength indicator (RSSI) based on one or more inbound physical layer convergence procedure (PLCP) protocol data units (PPDUs) received from a destination STA. The STA may determine, based at least partly on a comparison between the RSSI and a predetermined threshold, whether SR transmissions by other STAs in the channel are permissible. The SR transmissions may be concurrent to transmissions by the STA within the TXOP in the channel. The STA may transmit a PPDU to the destination STA that includes an SR indicator that indicates whether the SR transmissions are permissible.

18 Claims, 11 Drawing Sheets

STATION (STA), ACCESS POINT (AP) AND METHOD OF COMMUNICATION IN THE PRESENCE OF SPATIAL REUSE

PRIORITY CLAIM

This application claims priority under 35 USC 119(e) to U.S. Provisional Patent Application Ser. No. 62/397,408, filed Sep. 21, 2016, which is incorporated herein by reference in its entirety.

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11ac standard or the IEEE 802.11ax study group (SG) (named DensiFi). Some embodiments relate to high-efficiency (HE) wireless or high-efficiency WLAN or Wi-Fi communications. Some embodiments relate to channel contention. Some embodiments relate to spatial reuse.

BACKGROUND

Wireless communications have been evolving toward ever increasing data rates (e.g., from IEEE 802.11a/g to IEEE 802.11n to IEEE 802.11ac). In high-density deployment situations, overall system efficiency may be come more important than higher data rates. For example, in high-density hotspot and cellular offloading scenarios, many devices competing for the wireless medium may have low to moderate data rate requirements (with respect to the very high data rates of IEEE 802.11ac). A recently-formed study group for Wi-Fi evolution referred to as the IEEE 802.11 High Efficiency WLAN (HEW) study group (SG) (i.e., IEEE 802.11ax) is addressing these high-density deployment scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
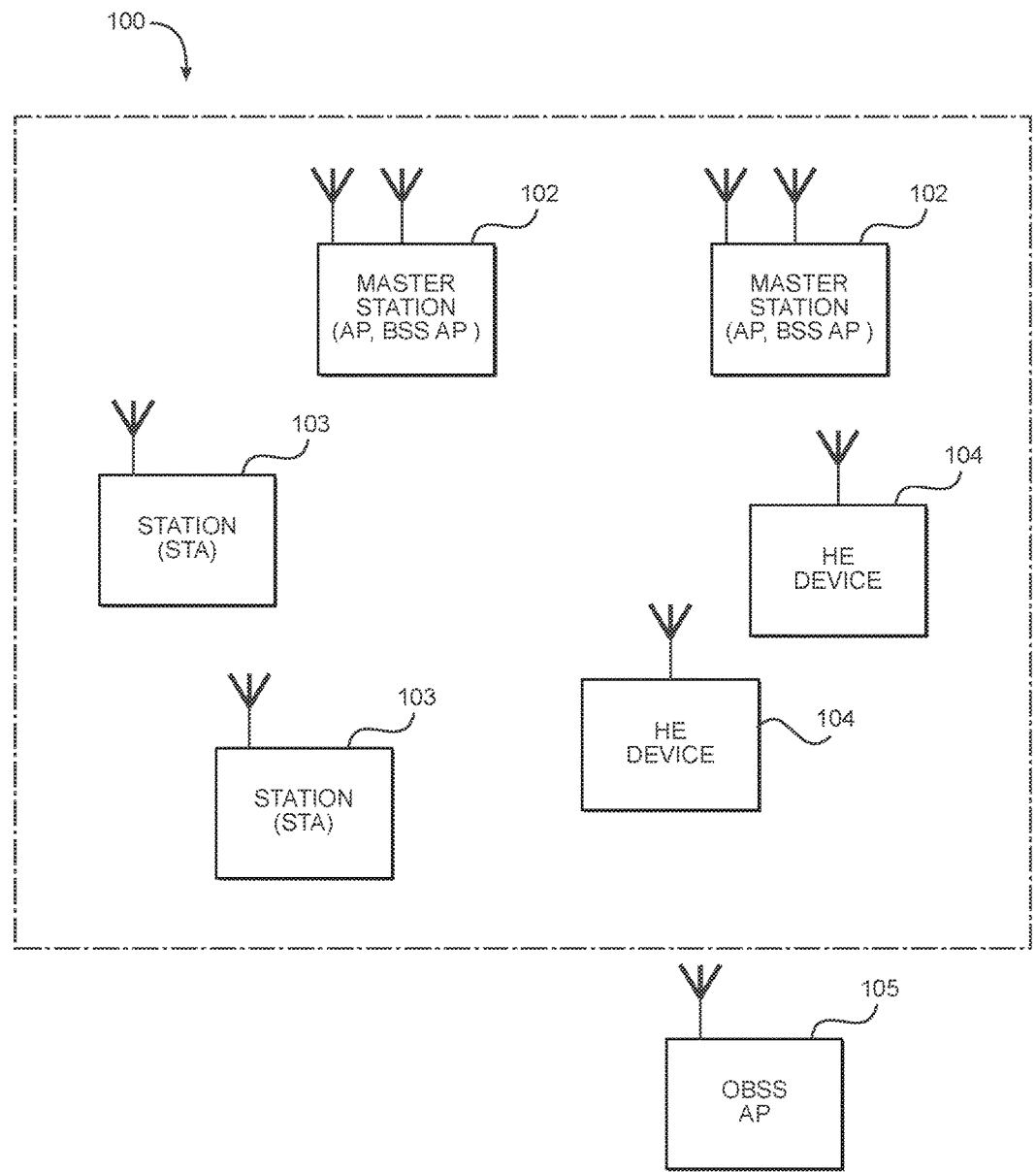
FIG. 1 illustrates a wireless network in accordance with some embodiments.

FIG. 1 illustrates a wireless network in accordance with some embodiments. In some embodiments, the network 100 may be a High Efficiency (HE) Wireless Local Area Network (WLAN) network. In some embodiments, the network 100 may be a WLAN or a Wi-Fi network. These embodiments are not limiting, however, as some embodiments of the network 100 may include a combination of such networks. That is, the network 100 may support HE devices in some cases, non HE devices in some cases, and a combination of HE devices and non HE devices in some cases. Accordingly, it is understood that although techniques described herein may refer to either a non HE device or to an HE device, such techniques may be applicable to both non HE devices and HE devices in some cases.

Referring to FIG. 1, the network 100 may include any or all of the components shown, and embodiments are not limited to the number of each component shown in FIG. 1. In some embodiments, the network 100 may include a master station (AP) 102 and may include any number (including zero) of stations (STAs) 103 and/or HE devices 104. In some embodiments, the AP 102 may receive and/or detect signals from one or more STAs 103, and may transmit data packets to one or more STAs 103. These embodiments will be described in more detail below.

In some embodiments, the AP 102 may be a basic service set (BSS) AP 102 configured to communicate with the STA 103 as part of a managed network, including but not limited to an extended service set (ESS) network (100 in this example). One or more APs 102 may operate as part of such a network 100, in some embodiments. One or more overlapping BSS (OBSS) APs 105 may be operational but not part of the ESS network 100, and may provide interference to the STA 103. In some embodiments, the OBSS APs 105 may be devices with which the STA 103 may not necessarily communicate. For instance, the STA 103 may not be associated with the OBSS APs 105 in some cases, but may still detect/receive packets from the OBSS APs 105. It should be noted that the OBSS AP 105 is illustrated as being outside of the ESS network 100 geographically in this example, but this is not limiting. In some cases, the OBSS APs 105 may be located within a coverage area of the ESS network 100

(and/or BSS APs of the ESS network 100). These embodiments will be described in more detail below.

The AP 102 may be arranged to communicate with one or more of the components shown in FIG. 1 in accordance with one or more IEEE 802.11 standards (including 802.11ax and/or others), other standards and/or other communication protocols. It should be noted that embodiments are not limited to usage of an AP 102. References herein to the AP 102 are not limiting and references herein to the master station 102 are also not limiting. In some embodiments, a STA 103, HE device 104 and/or other device may be configurable to operate as a master station. Accordingly, in such embodiments, operations that may be performed by the AP 102 as described herein may be performed by the STA 103, HE device 104 and/or other device that is configurable to operate as the master station.

In some embodiments, one or more of the STAs 103 may be legacy stations. These embodiments are not limiting, however, as the STAs 103 may be configured to operate as HE devices 104 or may support HE operation in some embodiments. The master station 102 may be arranged to communicate with the STAs 103 and/or the HE stations 104 in accordance with one or more of the IEEE 802.11 standards, including 802.11ax and/or others. In accordance with some HE embodiments, an access point (AP) may operate as the master station 102 and may be arranged to contend for a wireless medium (e.g., during a contention period) to receive exclusive control of the medium for an HE control period (i.e., a transmission opportunity (TXOP)). The master station 102 may, for example, transmit a master-sync or control transmission at the beginning of the HE control period to indicate, among other things, which HE stations 104 are scheduled for communication during the HE control period. During the HE control period, the scheduled HE stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HE control period, the master station 102 may communicate with HE stations 104 using one or more HE PPDUs. During the HE control period, STAs 103 not operating as HE devices may refrain from communicating in some cases. In some embodiments, the master-sync transmission may be referred to as a control and schedule transmission.

In some embodiments, the multiple-access technique used during the HE control period may be a scheduled orthogonal frequency-division multiple access (OFDMA) technique, although this is not a requirement. In some embodiments, the multiple access technique may be a time-division multiple access (TDMA) technique or a frequency-division multiple access (FDMA) technique. In some embodiments, the multiple access technique may be a space-division multiple access (SDMA) technique including a multi-user (MU) multiple-input multiple-output (MIMO) MU-MIMO) technique. These multiple-access techniques used during the HE control period may be configured for uplink or downlink data communications.

The master station 102 may also communicate with STAs 103 and/or other legacy stations in accordance with legacy IEEE 802.11 communication techniques. In some embodiments, the master station 102 may also be configurable to communicate with the HE stations 104 outside the HE control period in accordance with legacy IEEE 802.11 communication techniques, although this is not a requirement.

In some embodiments, the HE communications during the control period may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, sub-channel bandwidths less than 20 MHz may also be used. In these embodiments, each channel or sorb-channel of an HE communication may be configured for transmitting a number of spatial streams.

In some embodiments, high-efficiency (HE) wireless techniques may be used, although the scope of embodiments is not limited in this respect. As an example, techniques included in 802.11ax standards and/or other standards may be used. In accordance with some embodiments, a master station 102 and/or HE stations 104 may generate an HE packet in accordance with a short preamble format or a long preamble format. The HE packet may comprise a legacy signal field (L-SIG) followed by one or more HE, signal fields (HE-SIG) and an HE long-training field (HE-LTF). For the short preamble format, the fields may be configured for shorter-delay spread channels. For the long preamble format, the fields may be configured for longer-delay spread channels. These embodiments are described in more detail below, it should be noted that the terms "HEW" and "HE" may be used interchangeably and both terms may refer to high-efficiency Wireless Local Area Network operation and/ or high-efficiency Wi-Fi operation.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
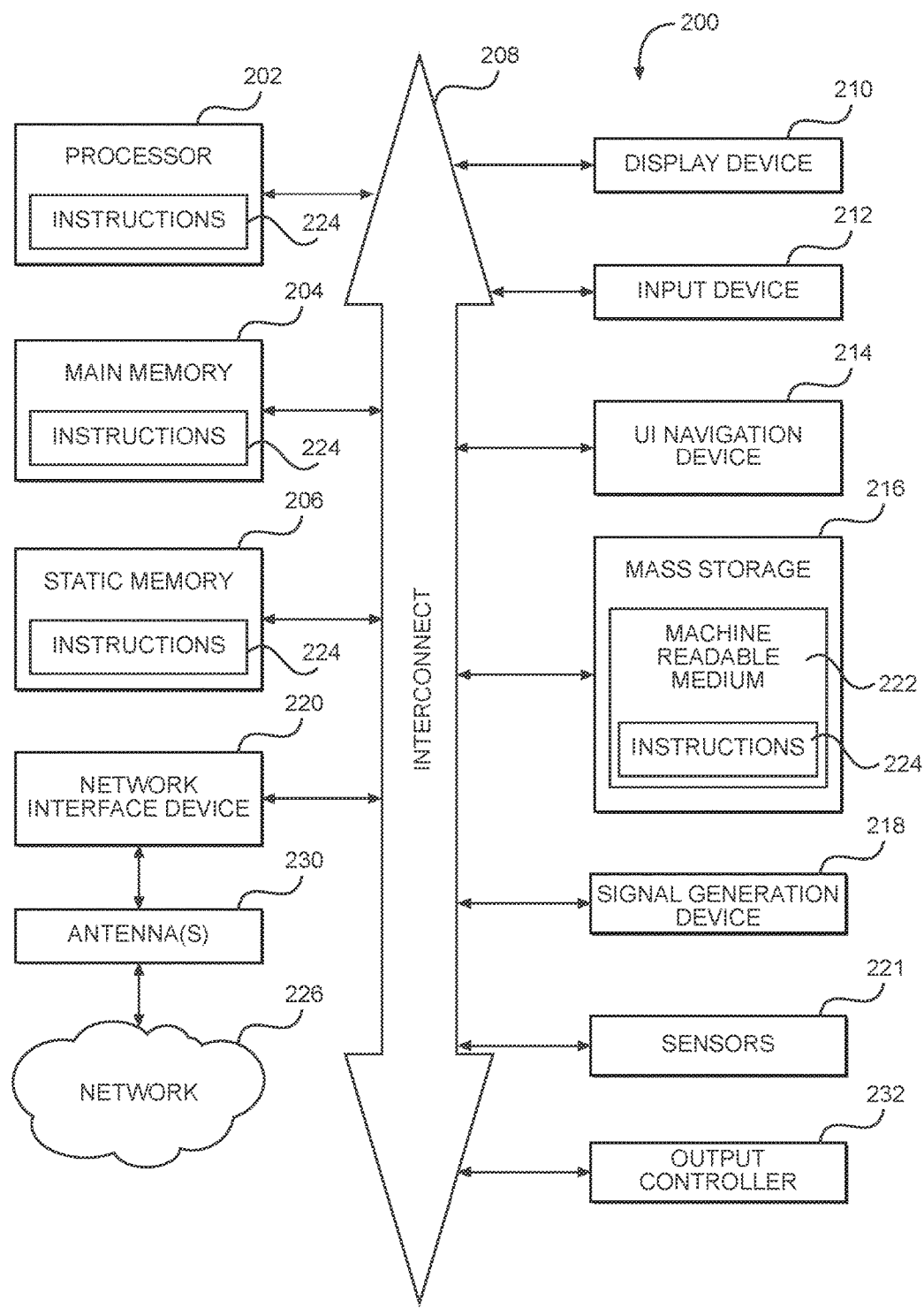
FIG. 2 illustrates an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be an AP 102, STA 103, HE device, HE AP, HE STA, UE, e-NB, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB)), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®). IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
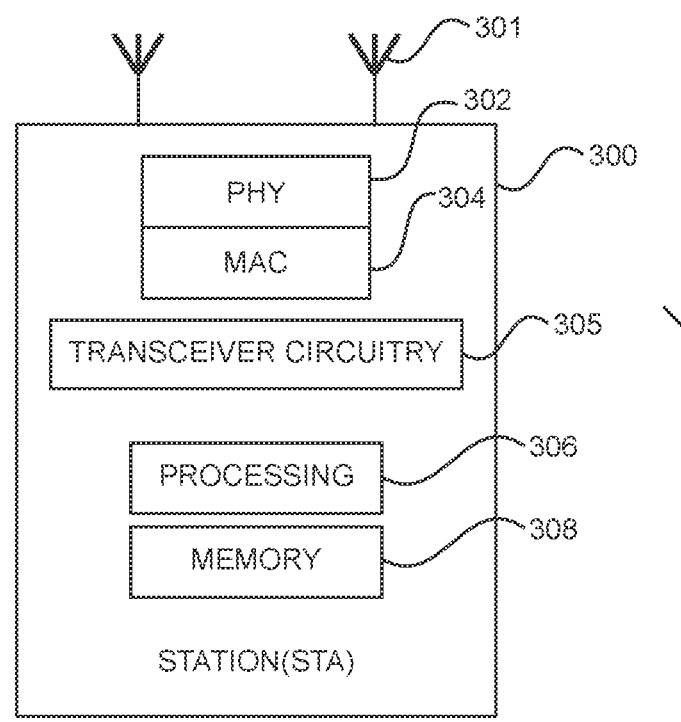
FIG. 3 illustrates a station (STA) in accordance with some embodiments and an access point (AP) in accordance with some embodiments.
Figure 3:
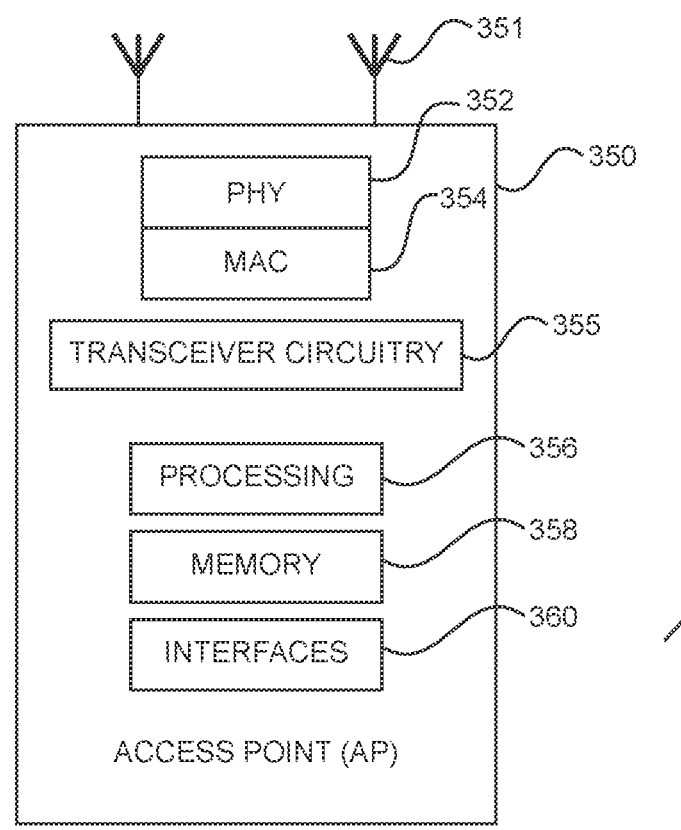

FIG. 3 illustrates a station (STA) in accordance with some embodiments and an access point (AP) in accordance with some embodiments. It should be noted that in some embodiments, an STA or other mobile device may include some or all of the components shown in either FIG. 2 or FIG. 3 (as in 300) or both. In some embodiments, an STA or other mobile device may include some or all of the components shown in FIGS. 2-7. The STA 300 may be suitable for use as an STA 103 as depicted in FIG. 1, in some embodiments. It should also be noted that in some embodiments, an AP or other base station may include some or all of the components shown in either FIG. 2 or FIG. 3 (as in 350) or both. In some embodiments, an AP or base station may include some or all of the components shown in FIGS. 2-7. The AP 350 may be suitable for use as an AP 102 as depicted in FIG. 1, in some embodiments.

The STA 300 may include physical layer circuitry 302 and a transceiver 305, one or both of which may enable transmission and reception of signals to and from components such as the AP 102 (FIG. 1), other STAs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The STA 300 may also include medium access control (MAC) layer circuitry 304 for controlling access to the wireless medium. The STA 300 may also include processing circuitry 306 and memory 308 arranged to perform the operations described herein.

The AP 350 may include physical layer circuitry 352 and a transceiver 355, one or both of which may enable transmission and reception of signals to and from components such as the STA 103 (FIG. 1), other APs or other devices using one or more antennas 351. As an example, the physical layer circuitry 352 may perform various encoding and decoding functions that may include formation of baseband signals for transmission and decoding of received signals. As another example, the transceiver 355 may perform various transmission and reception functions such as conversion of signals between a baseband range and a Radio Frequency (RF) range. Accordingly, the physical layer circuitry 352 and the transceiver 355 may be separate components or may be part of a combined component. In addition, some of the described functionality related to transmission and reception of signals may be performed by a combination that may include one, any or all of the physical layer circuitry 352, the transceiver 355, and other components or layers. The AP 350 may also include medium access control (MAC) layer circuitry 354 for controlling access to the wireless medium. The AP 350 may also include processing circuitry 356 and memory 358 arranged to perform the operations described herein.

The antennas 301, 351, 230 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301, 351, 230 may be effectively separated to take advantage of spatial diversity and the different channel characteristics that may result.

In some embodiments, the STA 300 may be configured as an HE device 104 (FIG. 1), and may communicate using OFDM and/or OFDMA communication signals over a multicarrier communication channel. In some embodiments, the AP 350 may be configured to communicate using OFDM and/or OFDMA communication signals over a multicarrier communication channel. In some embodiments the HE device 104 may be configured to communicate using OFDM communication signals over a multicarrier communication channel. Accordingly, in some cases, the STA 300, AP 350 and/or HE device 104 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HE standards, although the scope of the embodiments is not limited in this respect as they may also be suitable to transmit and/or receive communications in accordance with other techniques and standards. In some other embodiments, the AP 350, HE device 104 and/or the STA 300 configured as an HE device 104 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect. Embodiments disclosed herein provide two preamble formats for High Efficiency (HE) Wireless LAN standards specification that is under development in the IEEE Task Group 11ax (TGax).

In some embodiments, the STA 300 and/or AP 350 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the STA 300 and/or AP 350 may be configured to operate in accordance with 802.11 standards, although the scope of the embodiments is not limited m this respect. Mobile devices or other devices in some embodiments may be configured to operate according to other protocols or standards, including other IEEE standards, Third Generation Partnership Project (3GPP) standards or other standards some embodiments, the STA 300 and/or AP 350 may include one or more of a keyboard, a display, a non-volatile memory port, multiple antennas, a graphics processor, an application processor, speakers, and other mobile device elements. The display may be an LCD screen including a touch screen.

Although the STA 300 and the AP 350 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the STA 300 may include various components of the STA 300 as shown in FIG. 3 and/or the example machine 200 as shown in FIG. 2. Accordingly, techniques and operations described herein that refer to the STA 300 (or 103) may be applicable to an apparatus for an STA, in some embodiments. It should also be noted that in some embodiments, an apparatus used by the AP 350 may include various components of the AP 350 as shown in FIG. 3 and/or the example machine 200 as shown in FIG. 2. Accordingly, techniques and operations described herein that refer to the AP 350 (or 102) may be applicable to an apparatus for an AP, in some embodiments. In addition, an apparatus for a mobile device and/or base station may include one or more components shown in FIGS. 2-3, in some embodiments. Accordingly, techniques and operations described herein that refer to a mobile device and/or base station may be applicable to an apparatus for a mobile device and/or base station, in some embodiments.

Figure 4:
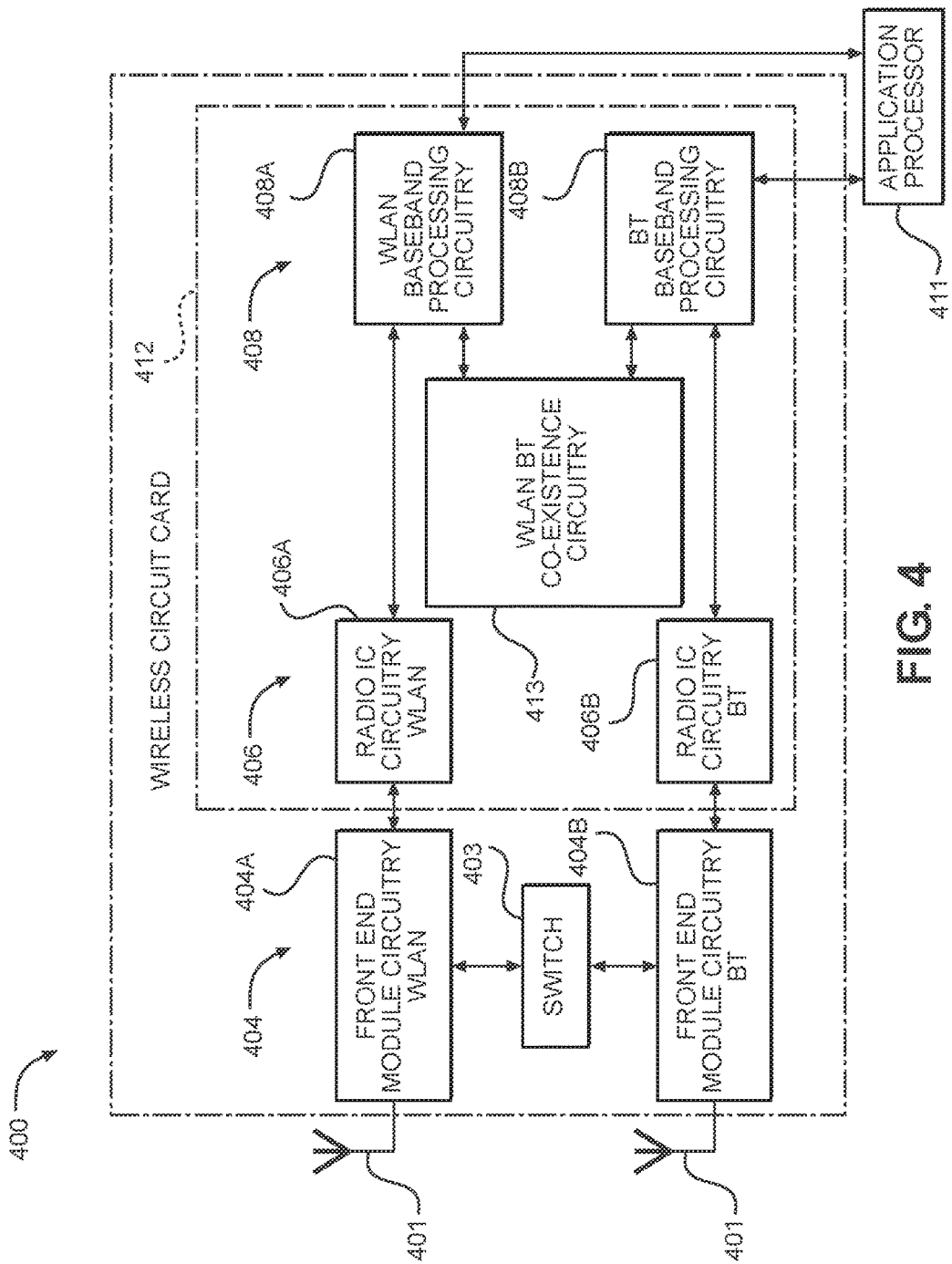
FIG. 4 is a block diagram of a radio architecture in accordance with some embodiments.

FIG. 4 is a block diagram of a radio architecture 400 in accordance with some embodiments. Radio architecture 400 may include radio front-end module (FEM) circuitry 404, radio IC circuitry 406 and baseband processing circuitry 408. Radio architecture 400 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 404 may include a WLAN or Wi-Fi FEM circuitry 404a and a Bluetooth (BT) FEM circuitry 404b. The WLAN FEM circuitry 404a may include a receive signal path comprising circuitry configured to operate on WLAN RF signals received from one or more antennas 401, to amplify the received signals and to provide the amplified versions of the received signals to the WLAN radio IC circuitry 406a for further processing. The BT FEM circuitry 404b may include a receive signal path which may include circuitry configured to operate on BT RF signals received from one or more antennas 402, to amplify the received signals and to provide the amplified versions of the received signals to the BT radio IC circuitry 406b for further processing. FEM circuitry 404a may also include a transmit signal path which may include circuitry configured to amplify WLAN signals provided by the radio IC circuitry 406a for wireless transmission by one or more of the antennas 401. In addition, FEM circuitry 404b may also include a transmit signal path which may include circuitry configured to amplify BT signals provided by the radio IC circuitry 406b for wireless transmission by the one or more antennas. In the embodiment of FIG. 4, although FEM 404a and FEM 404b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 406 as shown may include WLAN radio IC circuitry 406a and BT radio IC circuitry 406b. The WLAN radio IC circuitry 406a may include a receive signal path which may include circuitry to down-convert WLAN RF signals received from the FEM circuitry 404a and provide baseband signals to WLAN baseband processing circuitry 408a. BT radio IC circuitry 406b may in turn include a receive signal path which may include circuitry to down-convert BT RF signals received from the FEM circuitry 404b and provide baseband signals to BT baseband processing circuitry 408b. WLAN radio IC circuitry 406a may also include a transmit signal path which may include circuitry to up-convert WLAN baseband signals provided by the WLAN baseband processing circuitry 408a and provide WLAN RF output signals to the FEM circuitry 404a for subsequent wireless transmission by the one or more antennas 401. BT radio IC circuitry 406b may also include a transmit signal path which may include circuitry to up-convert BT baseband signals provided by the BT baseband processing circuitry 408b and provide BT RF output signals to the FEM circuitry 404b for subsequent wireless transmission by the one or more antennas 401. In the embodiment of FIG. 4, although radio IC circuitries 406a and 406b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 408 may include a WLAN baseband processing circuitry 408a and a BT baseband processing circuitry 408b. The WLAN baseband processing circuitry 408a may include a memory, such as, for example, a set of RAM arrays in a Fast Fourier Transform or Inverse Fast Fourier Transform block (not shown) of the WLAN baseband processing circuitry 408a. Each of the WLAN baseband circuitry 408a and the BT baseband circuitry 408b may further include one or more processors and control logic to process the signals received from the corresponding WLAN or BT receive signal path of the radio IC circuitry 406, and to also generate corresponding WLAN or BT baseband signals for the transmit signal path of the radio IC circuitry 406. Each of the baseband processing circuitries 408a and 408b may further include physical layer (PHY) and medium access control layer (MAC) circuitry, and may further interface with application processor 410 for generation and processing of the baseband signals and for controlling operations of the radio IC circuitry 406.

Referring still to FIG. 4, according to the shown embodiment, WLAN-BT coexistence circuitry 413 may include logic providing an interface between the WLAN baseband circuitry 408a and the BT baseband circuitry 408b to enable use cases requiring WLAN and BT coexistence. In addition, a switch 403 may be provided between the WLAN FEM, circuitry 404a and the BT FEM circuitry 404b to allow switching between the WLAN and BT radios according to application needs. In addition, although the antennas 401 are depicted as being respectively connected to the WLAN FEM circuitry 404a and the BT FEM circuitry 404b, embodiments include within their scope the sharing of one or more antennas as between the WLAN and BT FEMs, or the provision of more than one antenna connected to each of FEM 404a or 404b.

In some embodiments, the front-end module circuitry 404, the radio IC circuitry 406, and baseband processing circuitry 408 may be provided on a single radio card, such as wireless radio card 402. In some other embodiments, the one or more antennas 401, the FEM circuitry 404 and the radio IC circuitry 406 may be provided on a single radio card. In some other embodiments, the radio IC circuitry 406 and the baseband processing circuitry 408 may be provided on a single chip or integrated circuit (IC), such as IC 412.

In some embodiments, the wireless radio card 402 may include a WLAN radio card and may be configured for Wi-Fi communications, although the scope of the embodiments is not limited in this respect. In some of these embodiments, the radio architecture 400 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 400 may be part of a communication station (STA) such as a wireless access point (AP), a base station or a mobile device including a Wi-Fi device. In some of these embodiments, radio architecture 400 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, and/or 802.11ax standards and/or proposed specifications for WLANs, although the scope of embodiments is not limited in this respect. Radio architecture 400 may also be suitable to transmit and/or receive communications in accordance with other techniques and standards.

In some embodiments, the radio architecture 400 may be configured for high-efficiency (HE) Wi-Fi (HEW) communications in accordance with the IEEE 802.11ax standard. In these embodiments, the radio architecture 400 may be configured to communicate in accordance with an OFDMA technique, although the scope of the embodiments is not limited in this respect.

In some other embodiments, the radio architecture 400 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 4, the BT baseband circuitry 408b may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 4, the radio architecture 400 may be configured to establish a BT synchronous connection oriented (SCO) link and or a BT low energy (BT LE) link. In some of the embodiments that include functionality, the radio architecture 400 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 4, the functions of a BT radio card and WLAN radio card may be combined on a single wireless radio card, such as single wireless radio card 402, although embodiments are not so limited, and include within their scope discrete WLAN and BT radio cards.

In some embodiments, the radio-architecture 400 may include other radio cards, such as a cellular radio card configured for cellular (e.g., 3GPP such as LTE, LTE Advanced or 5G communications).

In some IEEE 802.11 embodiments, the radio architecture 400 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 5:
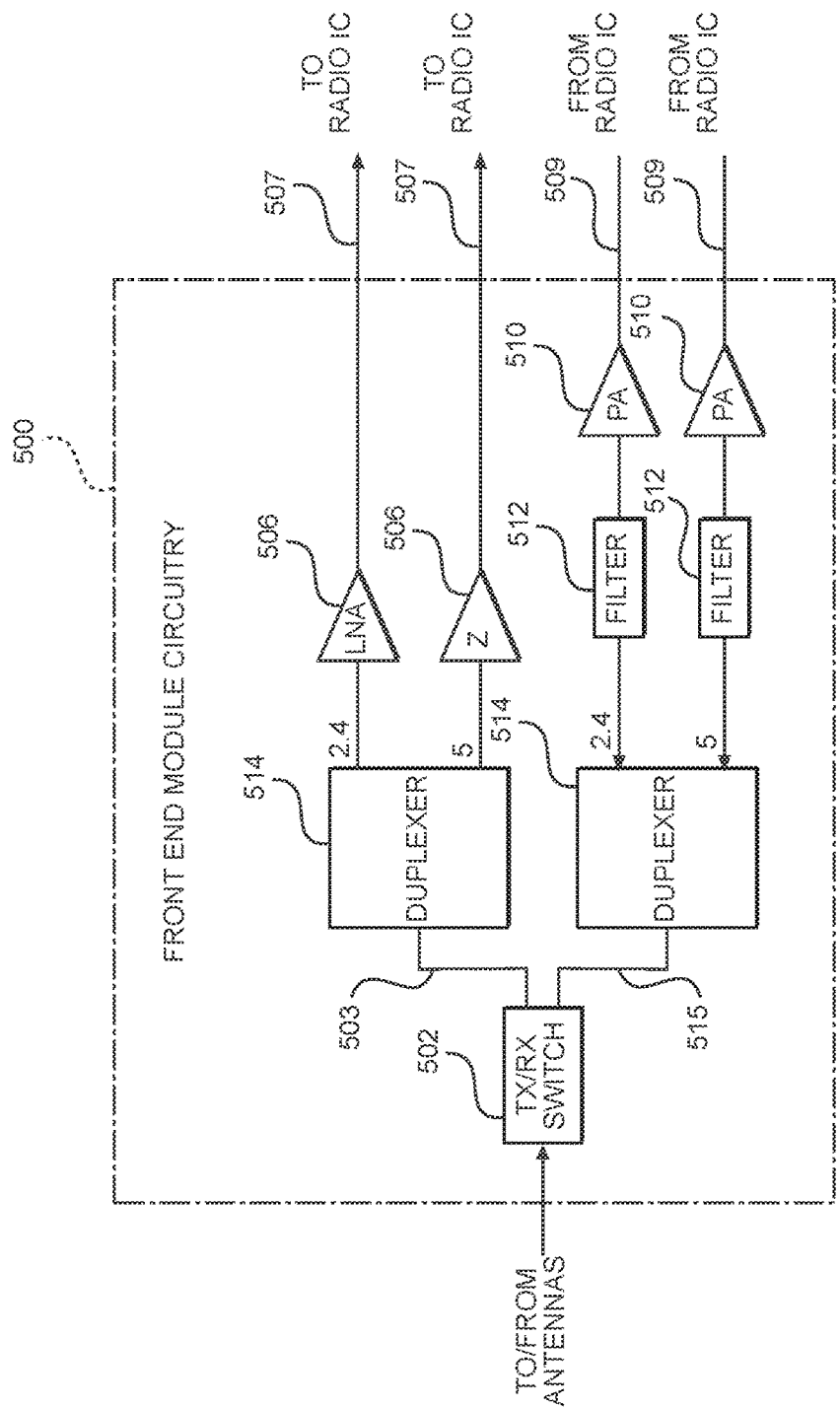
FIG. 5 illustrates a front-end module circuitry for use in the radio architecture of FIG. 4 in accordance with some embodiments.

FIG. 5 illustrates FEM circuitry 500 in accordance with some embodiments. The FEM circuitry 500 is one example of circuitry that may be suitable for use as the WLAN and/or BT FEM circuitry 404a/404b (FIG. 4), although other circuitry configurations may also be suitable.

In some embodiments, the FEM circuitry 500 may include a TX/RX switch 502 to switch between transmit mode and receive mode operation. The FEM circuitry 500 may include a receive signal path and a transmit signal path. The receive signal path of the FEM circuitry 500 may include a low-noise amplifier (LNA) 506 to amplify received RF signals 503 and provide the amplified received RF signals 507 as an output (e.g., to the radio IC circuitry 406 (FIG. 4)). The transmit signal path of the circuitry 500 may include a power amplifier (PA) to amplify input RF signals 509 (e.g., provided by the radio IC circuitry 406), and one or more filters 512, such as band-pass filters (BPFs), low-pass filters (LPFs) or other types of filters, to generate RF signals 515 for subsequent transmission (e.g., by one or more of the antennas 401 (FIG. 4)).

In some dual-mode embodiments for Wi-Fi communication, the FEM circuitry 500 may be configured to operate in either the 2.4 GHz frequency spectrum or the 5 GHz frequency spectrum. In these embodiments, the receive signal path of the FEM circuitry 500 may include a receive signal path duplexer 504 to separate the signals from each spectrum as well as provide a separate LNA 506 for each spectrum as shown. In these embodiments, the transmit signal path of the FEM circuitry 500 may also include a power amplifier 510 and a filter 512, such as a BPF, a LPF or another type of filter for each frequency spectrum and a transmit signal path duplexer 514 to provide the signals of one of the different spectrums onto a single transmit path for subsequent transmission by the one or more of the antennas 401 (FIG. 4). In some embodiments, BT communications may utilize the 2.4 GHZ signal paths and may utilize the same FEM circuitry 500 as the one used for WLAN communications.

Figure 6:
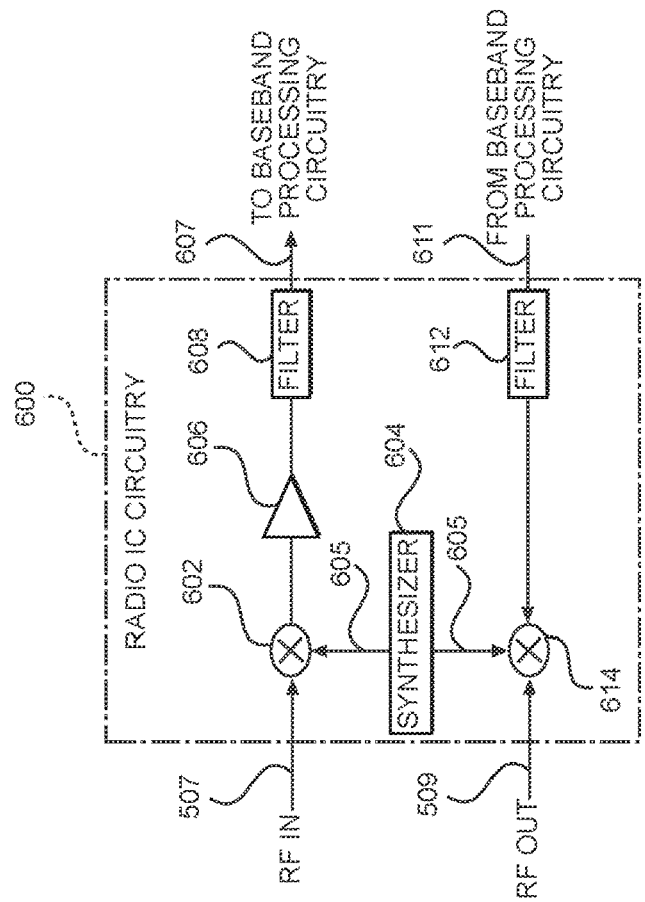
FIG. 6 illustrates a radio IC circuitry for use in the radio architecture of FIG. 4 in accordance with some embodiments.

FIG. 6 illustrates radio IC circuitry 600 in accordance with some embodiments. The radio IC circuitry 600 is one example of circuity that may be suitable for use as the WLAN or BT radio IC circuitry 406a/406b (FIG. 4), although other circuitry configurations may also be suitable.

In some embodiments, the radio IC circuitry 600 may include receive signal path and a transmit signal path. The receive signal path of the radio IC circuitry 600 may include at least mixer circuitry 602, such as, for example, down-conversion mixer circuitry, amplifier circuitry 606 and filter circuitry 608. The transmit signal path of the radio IC circuitry 600 may include at least filter circuitry 612 and mixer circuitry 614, such as, for example, up-conversion mixer circuitry. Radio IC circuitry 600 may also include synthesizer circuitry 604 for synthesizing a frequency 605 for use by the mixer circuitry 602 and the mixer circuitry 614. The mixer circuitry 602 and/or 614 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 6 illustrates only a simplified version of a radio IC circuitry, and may include, although not shown, embodiments where each of the depicted circuitries may include more than one component. For instance, mixer circuitry 620 and/or 614 may each include one or more mixers, and filter circuitries 608 and/or 612 may each include one or more filters, such as one or more BPFs and/or LPFs according to application needs. For example, when mixer circuitries are of the direct-conversion type, they may each include two or more mixers.

In some embodiments, mixer circuitry 602 may be configured to down-convert RF signals 507 received from the FEM circuitry 404 (FIG. 4) based on the synthesized frequency 605 provided by synthesizer circuitry 604. The amplifier circuitry 606 may be configured to amplify the down-converted signals and the filter circuitry 608 may include a LPF configured to remove unwanted signals from the down converted signals to generate output baseband signals 607. Output baseband signals 607 may be provided to the baseband processing circuitry 408 (FIG. 4) for further processing. In some embodiments, the output baseband signals 607 may be zero-frequency baseband signals, although this is not a requirement. In some embodiments, mixer circuitry 602 may comprise passive mixers, although the scope of the embodiments is not limited in this respect.

In some embodiments, the mixer circuitry 614 may be configured to up-convert input baseband signals 611 based on the synthesized frequency 605 provided by the synthesizer circuitry 604 to generate RF output signals 509 for the FEM circuitry 404. The baseband signals 611 may be provided by the baseband processing circuitry 408 and may be filtered by filter circuitry 612. The filter circuitry 612 may include a LPF or a BPF, although the scope of the embodiments is not limited in this respect.

In some embodiments, the mixer circuitry 602 and the mixer circuitry 614 may each include two or more mixers and may be arranged for quadrature down-conversion and/or up-conversion respectively with the help of synthesizer 604. In some embodiments, the mixer circuitry 602 and the mixer circuitry 614 may each include two or more mixers each configured for image rejection. (e.g., Hartley image rejection). In some embodiments, the mixer circuitry 602 and the mixer circuitry 614 may be arranged for direct down-conversion and/or direct up-conversion, respectively. In some embodiments, the mixer circuitry 602 and the mixer circuitry 614 may be configured for super-heterodyne operation, although this is not a requirement.

Mixer circuitry 602 may comprise, according to one embodiment: quadrature passive mixers (e.g., for the in-phase (I) and quadrature phase (Q) paths). In such an embodiment, RF input signal 507 from FIG. 6 may be down-converted to provide I and Q baseband output signals to be sent to the baseband processor.

Quadrature passive mixers may be driven by zero and ninety degree time-varying LO switching signals provided by a quadrature circuitry which may be configured to receive a LO frequency ($f_{LO}$) from a local oscillator or a synthesizer, such as LO frequency 605 of synthesizer 604 (FIG. 6). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety degree time varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 507 (FIG. 5) may comprise a balanced signal, although the scope of the embodiments is not limited in this respect. The I and Q baseband output signals may be provided to low-nose amplifier, such as amplifier circuitry 606 (FIG. 6) or to filter circuitry 608 (FIG. 6).

In some embodiments, the output baseband signals 607 and the input baseband signals 611 may be analog baseband signals, although the scope of the embodiments is not limited in this respect. In some alternate embodiments, the output baseband signals 607 and the input baseband signals 611 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 604 may be a fractional-N synthesizer or a fractional N/N+1 synthesizer, although the scope of the embodiments is not limited in this respect as other types of frequency synthesizers may be suitable. For example, synthesizer circuitry 604 may be a delta-sigma synthesizer, a frequency multiplier, or a synthesizer comprising a phase-locked loop with a frequency divider. According in some embodiments, the synthesizer circuitry 604 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 604 may be provided by a voltage controlled oscillator (VCO), although that is not a requirement. A divider control input may further be provided by either the baseband processing circuitry 408 (FIG. 4) or the application processor 410 (FIG. 4) depending on the desired output frequency 605. In some embodiments, a divider control input (e.g., N) may be determined from a look-up table within a Wi-Fi card) based on a channel number and a channel center frequency as determined or indicated by the application processor 410.

In some embodiments, synthesizer circuitry 604 may be configured to generate a carrier frequency as the output frequency 605, while in other embodiments, the output frequency 605 may be a fraction of the carrier frequency (e.g., one-half the carrier frequency, one-third the carrier frequency). In some embodiments, the output frequency 605 may be a LO frequency ($f_{LO}$).

Figure 7:
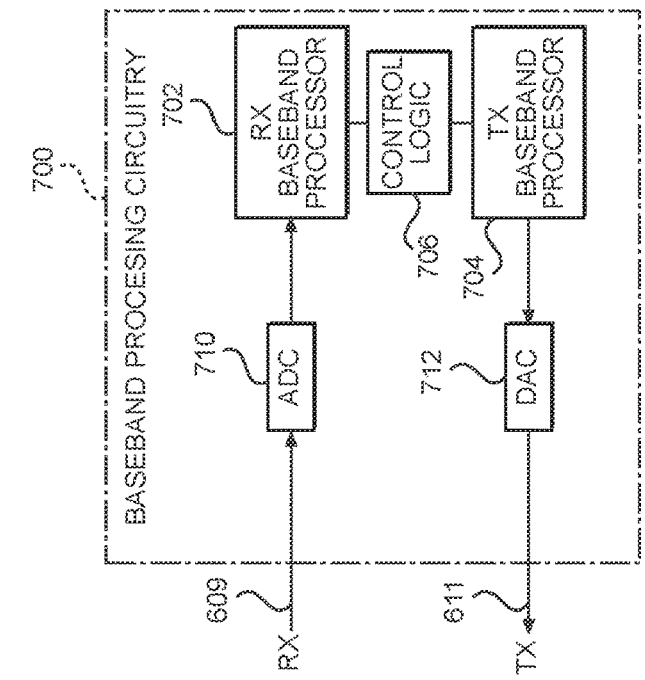
FIG. 7 illustrates a baseband processing circuitry for use in the radio architecture of FIG. 4 in accordance with some embodiments.

FIG. 7 illustrates a functional block diagram of baseband processing circuitry 700 in accordance with some embodiments. The baseband processing circuitry 700 is one example of circuitry that may be suitable for use as the baseband processing circuitry 408 (FIG. 4), although other circuitry configurations may also be suitable. The baseband processing circuitry 700 may include a receive baseband processor (RX BBP) 702 for processing receive baseband signals 609 provided by the radio IC circuitry 406 (FIG. 4) and a transmit baseband processor (TX BBP) 704 for generating transmit baseband signals 611 for the radio IC circuitry 406. The baseband processing circuitry 700 may also include control logic 706 for coordinating the operations of the baseband processing circuitry 700.

In some embodiments (e.g., when analog baseband signals are exchanged between the baseband processing circuitry 700 and the radio IC circuitry 406), the baseband processing circuitry 700 may include ADC 710 to convert analog baseband signals received from the radio IC circuitry 406 to digital baseband signals for processing by, the RX BBP 702. In these embodiments, the baseband processing circuitry 700 may also include DAC 712 to convert digital baseband signals from the TX BBP 704 to analog baseband signals.

In some embodiments that communicate OFDM signals or OFDMA signals, such as through baseband processor 408*a*, the transmit baseband processor 704 may be configured to generate OFDM or OFDMA signals as appropriate for transmission by performing an inverse fast Fourier transform (IFFT). The receive baseband processor 702 may be configured to process received OFDM signals or OFDMA signals by performing an FFT. In some embodiments, the receive baseband processor 702 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 4, in some embodiments, the antennas 401 (FIG. 4) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different Channel Characteristics that may result. Antennas 401 may each include a set of phased-array antennas, although embodiments are not so limited.

Although the radio-architecture 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In accordance with some embodiments, the STA 103 may determine a received signal strength indicator (RSSI) based on one or more inbound physical layer convergence procedure (PLCP) protocol data units (PPDUs) received from a destination STA 103. The STA 103 may determine, based at least partly on a comparison between the RSSI and a predetermined threshold, whether SR transmissions by other STAs 103 in the channel are permissible. The SR transmissions may be concurrent to transmissions by the STA 103 within the TXOP in the channel. The STA 103 may transmit a PPDU to the destination STA 103 that includes an SR indicator that indicates whether the SR transmissions are permissible. These embodiments will be described in more detail below.

Figure 8:
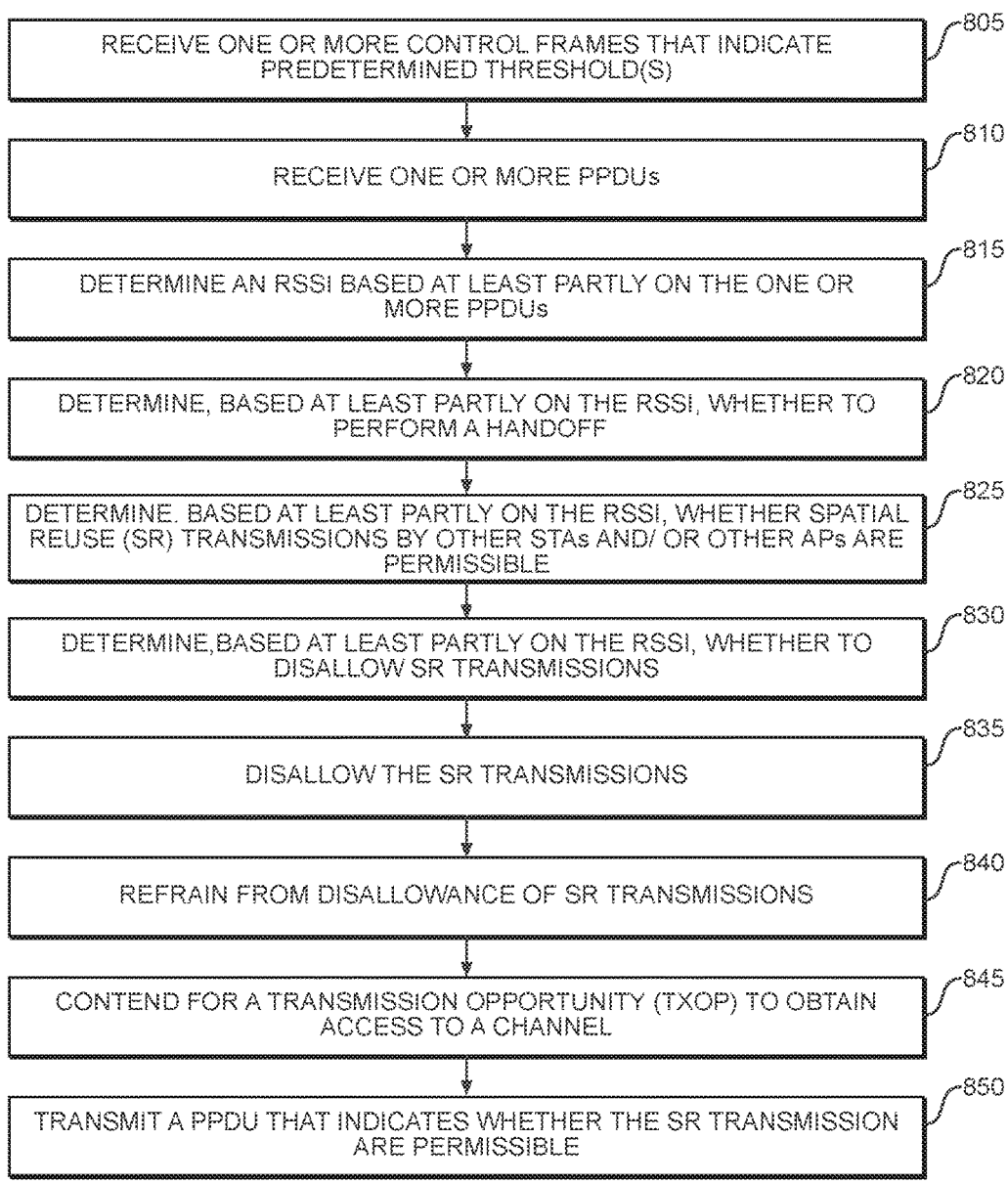
FIG. 8 illustrates the operation of a method of communication in accordance with some embodiments.

FIG. 6 illustrates the operation of a method of communication in accordance with some embodiments. It is important to note that embodiments of the method 800 may include additional or even fewer operations or processes in comparison to what is illustrated in FIG. 8. In addition, embodiments of the method 800 are not necessarily limited to the chronological order that is shown in FIG. 6. In describing the method 800, reference may be made to FIGS. 1-7 and 9-13, although it is understood that the method 300 may be practiced with any other suitable systems, interfaces and components.

In some embodiments, the AP 102 and/or STA 103 may be configurable to operate as an HE device 104. Although reference may be made to an AP 102 and/or STA 103 herein, including as part of the descriptions of the method 800 and/or other methods described herein, it is understood that an HE device 104, an AP 102 configurable to operate as an HE device 104 and/or STA 103 configurable to operate as an HE device 104 may be used in some embodiments. In addition, the method 800 and other methods described herein may be applicable to STAs 103, HE devices 104 and/or APs 102 operating in accordance with one or more standards and/or protocols, such as 802.11, Wi-Fi, wireless local area network (WLAN) and/or other, but embodiments of those methods are not limited to just those devices. In some embodiments, the method 800 and other methods described herein may be practiced by other mobile devices, such as an Evolved Node-B (eNB) or User Equipment (UE). The method 800 and other methods described herein may also be practiced by wireless devices configured to operate in other suitable types of wireless communication systems, including systems configured to operate according to various Third Generation Partnership Project (3GPP) Long Term Evolution (LTE) standards. The method 800 may also be applicable to an apparatus for an STA 103, HE device 104 and/or AP 102 or other device described above, in some embodiments.

It should also be noted that embodiments are not limited by references herein (such as in descriptions of the methods 800, 1100 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

It should be noted that references may be made to a "source STA" and/or "destination STA" herein for convenience, but this terminology is not limiting. For instance, the STA 103 may be referred to as a source STA when the STA 103 transmits signals, frames, packets and/or other elements. The STA 103 may be referred to as a destination STA 103 when the STA 103 receives signals, frames, packets and/or other elements.

At operation 805 of the method 800, the STA 103 may receive one or more control frames that indicate one or more predetermined thresholds. For instance, the one or more thresholds may be used in one or more operations described below. In some embodiments, the STA 103 may receive the one or more control frames from an AP 102, although the scope of embodiments are not limited in this respect. The control frame(s) may include one or more parameters (including but not limited to thresholds) to be used by the STA 103 for operations related to determination of whether to perform a handoff, whether to disallow SR transmissions by other STAs 103, other operations of the method 800 and/or other operations. Example parameters may include, but are not limited to, RSSI threshold(s), handoff threshold(s); other thresholds; and/or other parameters. Examples will be described herein. Embodiments are not limited to usage of control frame(s), as management frame(s), beacon frame(s) other frame(s) and/or other messages may be used in some embodiments.

In some embodiments, the control frame(s) may be received from a basic service set (BSS) access point (AP) to which the STA 103 communicates. In some embodiments, the control frame(s) may be received from a BSS AP to which the STA 103 intends to transmit a frame, signal and/or other element. In some embodiments, the control frame(s) may be received from a BSS AP to which the STA 103 is associated. The control frame(s) may be received at any suitable time. The BSS AP may be included in an extended service set (ESS) network, in some embodiments.

In a non-limiting example, the STA 103 may receive, from the AP 102, a handoff threshold. The handoff threshold may be predetermined, in some cases. The handoff threshold may indicate information related to a handoff, including but not limited to a minimum RSSI for received PPDUs for operation, by an STA 103, without a handoff to another AP 102 of the network. In another non-limiting example, the STA 103 may receive from the AP 102, a spatial reuse (SR) threshold. The SR threshold may be predetermined, in some cases. The SR threshold may indicate information related to SR transmissions. For instance, the SR threshold may indicate an RSSI that may be used to determine whether to disallow SR transmissions by other STAs 103 and/or APs 102, as will be described below. Embodiments are not limited to this particular usage of the SR threshold, however.

In some embodiments, the STA 103 may be arranged to operate in accordance with a wireless local area network (WLAN) protocol. In one or more operations and/or methods described herein, a handoff threshold and/or SR threshold may be used. The handoff threshold may be an extended service set (ESS) minimum threshold. The SR threshold may be an SR disallow RSSI threshold. Embodiments are not limited to usage of the ESS minimum threshold or the SR disallow RSSI threshold.

It should be noted that embodiments are not limited to usage of one or more thresholds received from the AP 102. In some embodiments, one or more thresholds (and/or value(s) to be used) may be received from other devices, such as other STAs 103. In some embodiments, one or more thresholds (and/or value(s) to be used) may be part of a standard.

At operation 810, the STA 103 may receive one or more physical layer convergence procedure (PLCP) protocol data units (PPDUs). In some embodiments, the PPDU(s) may be received from another STA 103. In some embodiments, the STA 103 may be configurable to operate as a source STA 103. Accordingly, the source STA 103 (and/or STA 103 configurable to operate as a source STA 103) may receive one or more inbound PPDUs from a destination STA 103 and may transmit one or more outbound PPDUs to the destination STA 103.

It should be noted, however, that embodiments are not limited to reception of the PPDU(s) from another STA 103. Although operations of the method 800 (and/or other methods) may be described herein in terms of a scenario in which the STA 103 exchanges PPDUs with another STA 103, the scope of embodiments are not limited as such. One or more such operations may be applicable to a scenario in which the STA 103 exchanges PPDUs with the AP 102. Accordingly, the PPDU(s) may be received from an AP 102 at operation 810, in some embodiments. Embodiments are not limited by these examples, however, as the PPDU(s) may be received from any suitable device. In addition, embodiments are not limited to PPDU(s), as any suitable packets may be used.

It should be noted that the PPDU(s) sent from the STA 103 to the other STA 103 may be referred to, without limitation, as outbound PPDU(s). The PPDU(s) received from the other STA 103 may be referred to, without limitation, as inbound PPDU(s). When the STA 103 exchanges PPDU(s) with the AP 102, the PPDU(s) received from the AP 102 may be referred to, without limitation, as downlink PPDU(s). When the STA 103 exchanges PPDU(s) with the AP 102, the PPDU(s) transmitted to the AP 102 may be referred to, without limitation, as uplink PPDU(s).

In some embodiments, a trigger frame (TF) may be received by the STA 103, and the PPDU(s) received at operation 810 may be received during a transmission opportunity (TXOP) obtained by the device that transmits the PPDU(s) (such as another STA or an AP). The TF may indicate the TXOP. The TF may indicate scheduling information for uplink transmissions and/or downlink transmissions, may schedule one or more uplink transmissions and/or downlink transmissions, may include information related to channel resources (such as resource units (RUs), subchannels and/or other) to be used for the uplink transmissions and/or downlink transmissions, time resources to be used for the uplink transmissions and/or downlink transmissions and/or other information.

At operation 815, the STA 103 may determine an RSSI based at least partly on the one or more PPDUs received at operation 810. Embodiments are not limited to usage of an RSSI, however, as any suitable measurement may be used. For instance, a received power level of the PPDU(s) at the STA 103 may be used. An average received power may be used, although embodiments are not limited as such, as any suitable power measurement may be used. The power measurement may be based on the received PPDU(s), although the scope of embodiments is not limited in this respect. In some embodiments, the power measurement may be based on previously received PPDU(s) from the other STA 103 or AP 102, such as an average power over multiple PPDUs.

In a non-limiting example, the RSSI may be based on an average signal strength of the latest inbound PPDU received at the STA 103. In another non-limiting example, the STA 103 may determine per-PPDU average signal strengths of the one or more inbound PPDUs. The RSSI may be based on an average of the per-PPDU average signal strengths. For instance, the previous N PPDUs (for any suitable value of N) may be used. In another non-limiting example, the STA 103 may determine per-PPDU average signal strengths of the one or more inbound PPDUs. The RSSI may be based on a minimum of the per-PPDU average signal strengths. For instance, the previous N PPDUs (for any suitable value of N) may be used.

In some embodiments, in scenarios in which the STA 103 exchanges PPDU(s) with the AP 102, the RSSI may be determined based on one or more average signal strengths (such as average signal strengths of downlink PPDU(s) from the AP 102), as in the above described techniques and/or other. However, in some cases, the RSSI may be included in one or more downlink PPDUs from the AP 102. For instance, the AP 102 may determine the RSSI based on uplink PPDU(s) and may communicate the RSSI to the STA 103. In a non-limiting example, the RSSI may be included in a header of a downlink PPDU.

The examples of determination of the RSSI are not limiting, however, as the RSSI may be determined using any suitable function of the one or more PPDU(s). Such a function may also be based on one or more other factors, in some embodiments.

At operation 820, the STA 103 may determine, based at least partly on the RSSI, whether to perform a handoff. For instance, the STA 103 may determine whether to perform a handoff and/or initiate a handoff to another AP 102 of the network. In a non-limiting example, the handoff may be performed and/or initiated it the RSSI is below the handoff threshold. This example is not limiting, however, as any suitable handoff techniques may be used. For instance, the handoff may be performed and/or initiated if the RSSI is below the handoff threshold for a duration of time or during a window of frames. An average RSSI during such a duration of time and/or window of frames may be used in some cases. The decision on whether to perform and/or initiate the handoff may be based on other factors, including but not limited to RSSI(s) of PPDU(s) received from other STAs 103. In some embodiments, the handoff may be performed and/or initiated by the AP 102.

At operation 825, the STA 103 may determine, based at least partly on the RSSI, whether spatial reuse (SR) transmissions by other STAs 103 and/or other APs 102 are permissible. At operation 830, the STA may determine, based at least partly on the RSSI, whether to disallow the SR transmissions. At operation 835, the STA 103 may disallow the SR transmissions.

In some embodiments, the STA 103 may determine whether SR transmissions are permissible during a particular period (such as a TXOP obtained by the STA 103, a time period during which the STA 103 is to transmit a PPDU and/or other period). It should be noted that descriptions herein may refer to SR transmissions. Embodiments are not limited to the examples of SR transmissions described herein.

In a non-limiting example, a first STA 103 may transmit a PPDU in a channel during a first time period. In some cases, a second STA may perform an SR transmission in the channel during the first time period. In some cases, the second STA 103 may perform the SR transmission in frequency resources that at least partially overlap the channel. In some cases, the second STA 103 may perform the SR transmission in a second time period that at least partially overlaps the first time period.

In some embodiments, the STA may be arranged to operate in accordance with a wireless local area network (WLAN) protocol. The STA 103 may receive one or more inbound PPDUs from a first AP 102 (which may or may not operate within a network). In a non-limiting example, the SR transmissions may include overlapping basic service set (OBSS) SR transmissions by one or more other STAs 103 of a second AP. For instance, the other STAs 103 may treat the STA 103 (the STA 103 that performs the method 800) as an OBSS. In some cases. In another norm-limiting example, the SR transmissions may include overlapping basic service set (OBSS) SR transmissions by another STA 103 that may not necessarily operate in a network and may not necessarily communicate with a second AP 102. For instance, the other STA 103 may communicate directly with another STA 103, and may treat the STA 103 (the STA 103 that performs the method 800) as an OBSS, in some cases. In another non-limiting example, the STA 103 may communicate with an AP 102 of a network, and the SR transmissions may include OBSS SR transmissions by one or more other STAs 103 external to the network.

In some embodiments, an SR transmission may be a transmission by another STA 103 and/or AP 102 that is concurrent to one or more transmissions by the STA 103 within the TXOP in the channel. In some embodiments, an SR transmission may be a transmission by another STA 103 and/or AP 102 during a particular period (such as described above) in a channel (such as a channel in which the STA 103 is to transmit a PPDU and/or has obtained a TXOP). In some embodiments, SR transmissions may be concurrent transmissions by two or more STAs 103 in a same channel within the TXOP. In some embodiments, SR transmissions may be concurrent transmissions by two or more STAs 103 in a same channel during time periods (within the TXOP or otherwise) that at least partially overlap.

In some embodiments, the STA 103 may determine, based at least partly on a comparison between the RSSI and a predetermined threshold, whether SR transmissions by other STAs 103 in the channel during the TXOP are permissible.

In some embodiments, the STA 103 may determine, based at least partly on the RSSI, one or more of the following: whether SR transmissions by other STAs 103 and/or other APs 102 are to be disallowed (and/or allowed) by the STA 103; whether the STA 103 may disallow (and/or allow) SR transmissions by other STAs 103 and/or other APs 102; whether to indicate to other STAs 103 and/or APs 102 that the SR transmissions are disallowed (and/or allowed) whether to indicate to other STAs 103 and/or APs 102 to refrain from SR transmissions; and/or other.

In a non-limiting example, the STA 103 may determine that the SR transmissions are permissible if the RSSI is greater than or equal to a predetermined threshold (such as an SR threshold and/or other). The STA 103 may determine that the SR transmissions are impermissible if the RSSI is less than the threshold. In some embodiments, if the RSSI is greater than or equal to the threshold, the STA 103 may not determine that the SR transmissions are impermissible. In some embodiments, if the RSSI is greater than or equal to the threshold, the STA 103 may be restricted from determining that the SR transmissions are impermissible. In some embodiments, if the RSSI is greater than or equal to the threshold, the STA 103 may not be able to disallow the SR transmissions.

In another non-limiting example, the STA 103 may determine that the SR transmissions are allowed if the RSSI is greater than or equal to a predetermined threshold (such as an SR threshold and/or other). The STA 103 may determine that the SR transmissions are disallowed if the RSSI is less than the threshold. In some embodiments, if the RSSI is greater than or equal to the threshold, the STA 103 may not determine that the SR transmissions are disallowed. In some embodiments, if the RSSI is greater than or equal to the threshold, the STA 103 may be restricted from determining that the SR transmissions are disallowed.

At operation 840, the STA 103 may refrain from disallowance of the SR transmissions. In some embodiments, the STA 103 may not be able to disallow the SR transmissions under one or more conditions. It should be noted that the SR transmissions described in the examples below (and/or elsewhere herein) may be SR transmissions in the channel during a time period (such as the TXOP, a time period during which the STA 103 is to transmit a PPDU and/or other time period), although the scope of embodiments is not limited in this respect.

In a non-limiting example, when the determined RSSI is greater than or equal to the SR threshold (and/or other predetermined threshold), one or more of the following may be applicable: the STA 103 may be restricted from disallowance of the SR transmissions; the STA 103 may not be able to disallow the SR transmissions; the STA 103 may not be able to indicate that the other STAs 103 and/or APs 102 are to refrain from the SR transmissions; the STA 103 may not be able to determine that the SR transmissions are impermissible; the STA 103 may determine that the SR transmissions are permissible and/or allowed; and/or other. In addition, when the determined RSSI is less than the SR threshold, one or more of the following may be applicable: the STA 103 may disallow the SR transmissions; the STA 103 may be able to disallow the SR transmissions; the STA 103 may be able to indicate that the other STAs 103 and/or APs 102 are to refrain from the SR transmissions; the STA 103 may be able to determine that the SR transmissions are impermissible, the STA 103 may determine that the SR transmissions are impermissible and/or disallowed; and/or other.

In another non-limiting example, the STA 103 may compare the RSSI to a handoff threshold and to the SR threshold. In some cases (such as described below), the SR threshold may be greater than the handoff threshold, although the scope of embodiments is not limited in this respect. When the RSSI is greater than or equal to the SR threshold or when the RSSI is less than the handoff threshold, one or more of the following may be applicable: the STA 103 may be restricted from disallowance of the SR transmissions; the STA 103 may not be able to disallow the SR transmissions; the STA 103 may not be able to indicate that the other STAs 103 and/or APs 102 are to refrain from the SR transmissions; the STA 103 may not be able to determine that the SR transmissions are impermissible; the STA 103 may determine that the SR transmissions are permissible and/or allowed.

Continuing the above example, when the RSSI is less than the SR threshold and when the RSSI is greater than or equal to the handoff threshold, one or more of the following may be applicable: the STA 103 may disallow the SR transmissions; the STA 103 may be able to disallow the SR transmissions; the STA 103 may indicate that the other STAs 103 and/or APs 102 are to refrain from the SR transmissions: the STA 103 may determine that the SR transmissions are impermissible and/or disallowed.

It should be noted that in the above example, two cases are described. In a first case, either of the following may be true: the RSSI is greater than or equal to the SR threshold (for instance, the RSSI is sufficiently high to tolerate SR transmissions by other STAs 103 and/or APs 102) or the RSSI is less than the handoff threshold (for instance, a handoff of the STA 103 has not been performed and/or initiated, although the RSSI is below the handoff threshold). In the first case, the STA 103 may not disallow the SR transmissions (and/or perform other operations described above for the conditions of the first case). In a second case, the RSSI is less than the SR threshold (for instance, the RSSI is not necessarily high enough to tolerate the SR transmissions) and greater than or equal to the handoff threshold (for instance, handoff has not been performed and/or initiated, as the RSSI is above the handoff threshold). In the second case, the STA 103 may disallow the SR transmissions (and/or perform other operations described above for the conditions of the second case).

It should be noted that the cases and/or decision logic described in the examples above are not limiting. In some embodiments, other conditions may be used, in addition to or instead of those described above. In a non-limiting example, whether or not a handoff has been performed and/or initiated may be incorporated into the decision logic, in some embodiments. In another non-limiting example, a threshold related to whether or not the STA 103 is to begin scanning for potential handoff may be used. For instance, when the RSSI drops below this threshold, the STA 103 may begin scanning. This threshold may be used, by itself or in combination with one or more other thresholds/parameters.

In some embodiments, the STA 103 may receive one or more control frames, management frames, beacon frames and/or other frames/messages that may include any or all of: the handoff threshold, the SR threshold and/or other parameters. In some embodiments, memory of the STA 103 (and/or memory of an apparatus for the STA 103) may be configurable to store one or more of those threshold values and/or other parameter(s).

At operation 845, the STA 103 may contend for a transmission opportunity (TXOP) to obtain access to a channel. In some embodiments, the STA 103 may contend for a TXOP during which the STA 103 is to control access to the channel. In some embodiments, the STA 103 may contend for a wireless medium during a contention period to receive exclusive control of the medium during a period, including but not limited to a TXOP and/or HE control period. The STA 103 may transmit, receive and/or schedule one or more frames and/or signals dining the period. The STA 103 may transmit and/or receive one or more frames and/or signals during the period. However, it should be noted that embodiments are not limited to scheduled transmission/reception or to transmission/reception in accordance with the exclusive control of the medium. Accordingly, an MPDU, PPDU, BA frame and/or other frame may be transmitted/received in contention-based scenarios and/or other scenarios, in some embodiments. Any suitable contention, methods, operations and/or techniques may be used, which may or may not be part of a standard. In a non-limiting example, one or more contention methods, operations and/or techniques of an 802.11 standard/protocol and/or WLAN standard/protocol may be used.

At operation 850, the STA 103 may transmit a PPDU that may indicates whether the SR transmissions are permissible. The PPDU may be transmitted during the TXOP in the channel, in some cases. It should be noted that the PPDU may be an outbound PPDU when it is transmitted to another STA 103, although the scope of embodiments is not limited in this respect. It should also be noted that the PPDU may be an uplink PPDU when it is transmitted to an AP 102, although the scope of embodiments is not limited in this respect. In addition, the STA 103 may transmit multiple PPDUs during the TXOP, in some cases. One or more of the PPDUs may indicate whether the SR transmissions are permissible.

In some embodiments, the PPDU may include an indicator (including but not limited to an SR indicator) to indicate whether the SR transmissions are permissible. For instance, a first value of the SR indicator may indicate that the SR transmissions are permissible. A second value of the SR indicator may indicate that the SR transmissions are impermissible.

In some embodiments, the PPDU may indicate (using the SR indicator, other indicator and/or other technique) one or more of the following: whether SR transmissions are permissible; whether SR transmissions are disallowed: whether other STAs 103 and/or APs 102 are to refrain from SR transmissions; and/or other. It should be noted that other techniques may be used to indicate such information, and embodiments are not limited to usage of an explicit indicator (such as the SR indicator).

In some embodiments, the STA 103 may be arranged to operate in accordance with a wireless local area network (WLAN) protocol. In a non-limiting example, the SR indicator may be and/or may include an SR disallow bit that is included in a high-efficiency (HE) signal (HE-SIG) field of the PPDU. Other fields of the PPDU may also be used, in some embodiments.

In some embodiments, the PPDU may include a length field that indicates a length of a transmission period over which the PPDU is to be transmitted. Embodiments are not limited to the length field, however, as other parameters may be used to indicate the transmission period. The first value of the SR indicator may indicate that the SR transmissions are permissible during the transmission period. The second value of the SR indicator may indicate that the SR transmissions are impermissible during the transmission period.

In some cases, under one or more conditions, the SR indicator may be restricted to a value that indicates that the SR transmissions are allowed. For instance, if the RSSI is greater than or equal to a predetermined threshold (such as the SR threshold and/or other), the SR indicator in the above example may be restricted to the first value (which indicates that the SR transmissions are permissible). In some embodiments, if the RSSI is greater than or equal to the SR threshold, the STA 103 may not disallow the SR transmissions (and/or determine that the SR transmissions are impermissible).

In some cases, the PPDU may indicate whether SR transmissions by other STAs 103 are disallowed and/or permissible. Accordingly, one or more of the other STAs 103 may consider the STA 103 as an OBSS STA 103 and may consider the PPDU an OBSS PPDU. The one or more of the other STAs 103 may perform one or more operations to determine whether to perform SR transmission(s), including but not limited to: examination of an SR indicator of the PPDU; determination of an RSSI based on the PPDU (including but not limited to determination using a legacy portion of the PPDU); comparison of the determined RSSI to a threshold, determination of a transmit power to use (in case it is determined that SR transmission(s) may be performed); techniques related to the plot shown in FIG. 12 (which will be described below); and/or other.

Figure 9:
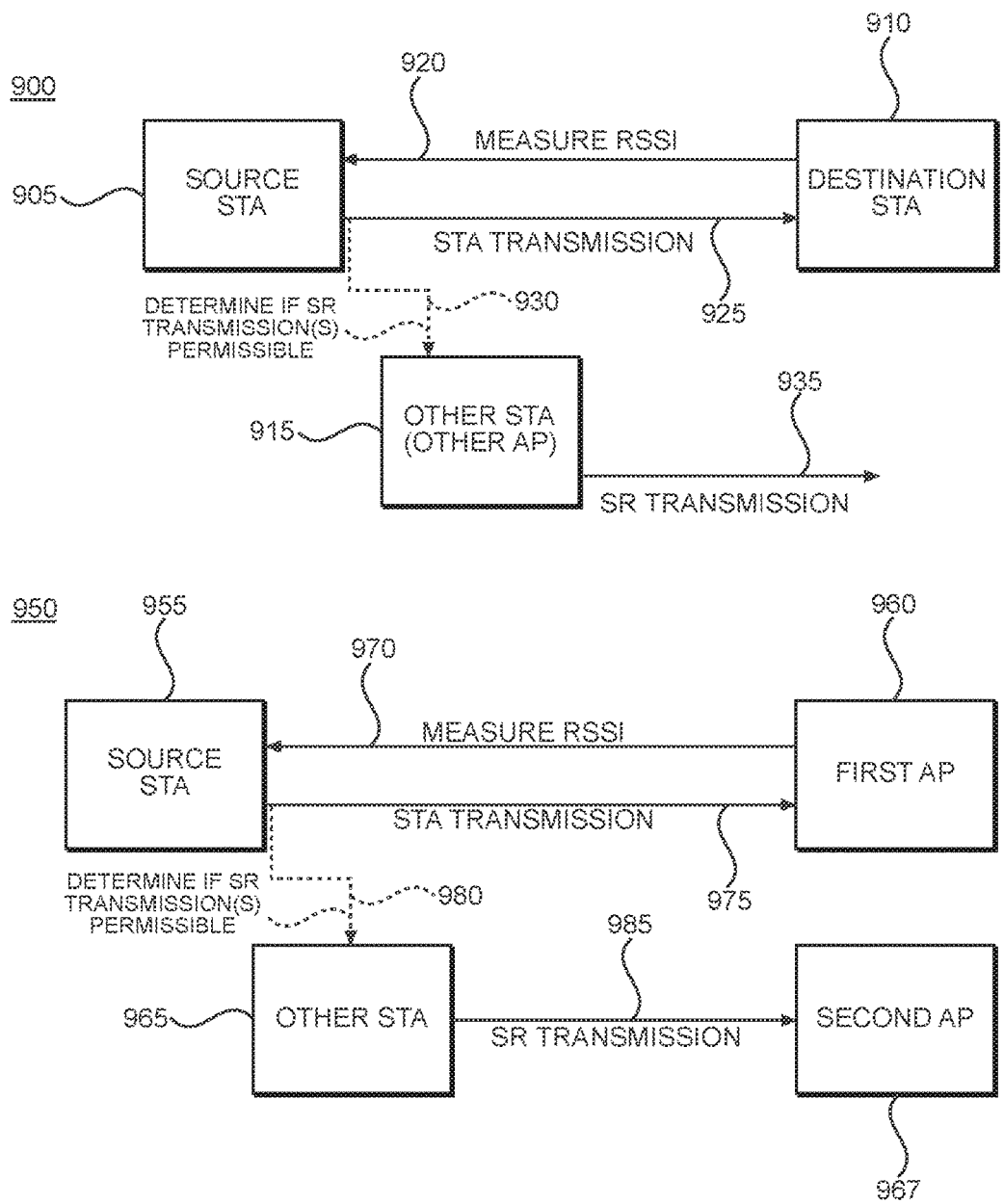
FIG. 9 illustrates an example scenario in which an STA may disallow spatial reuse (SR) transmissions in accordance with some embodiments.
Figure 10:
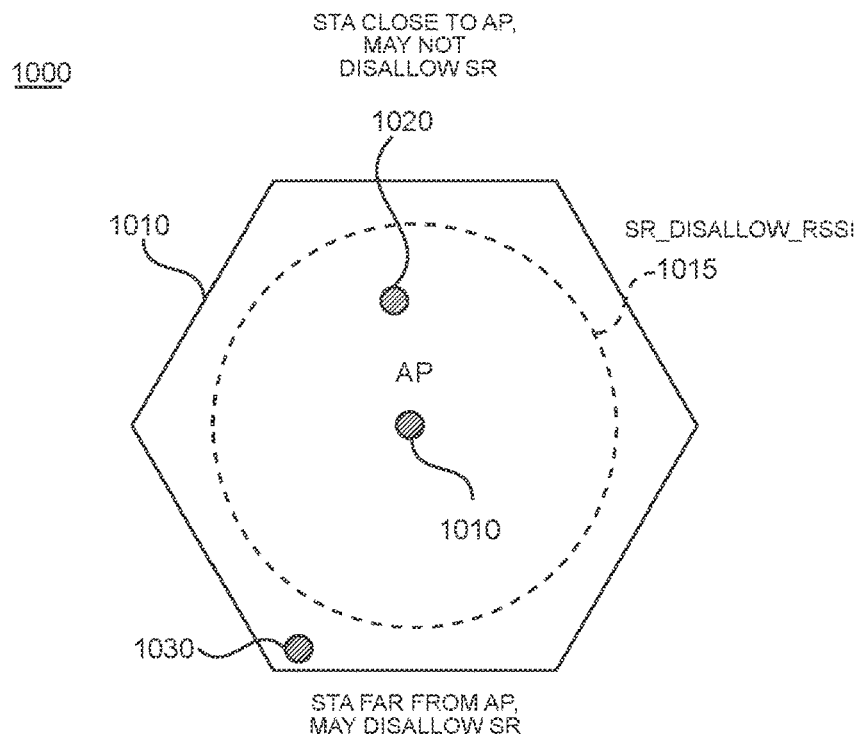
FIG. 10 illustrates another example scenario in which an STA may disallow spatial reuse (SR) transmissions in accordance with some embodiments.
Figure 11:
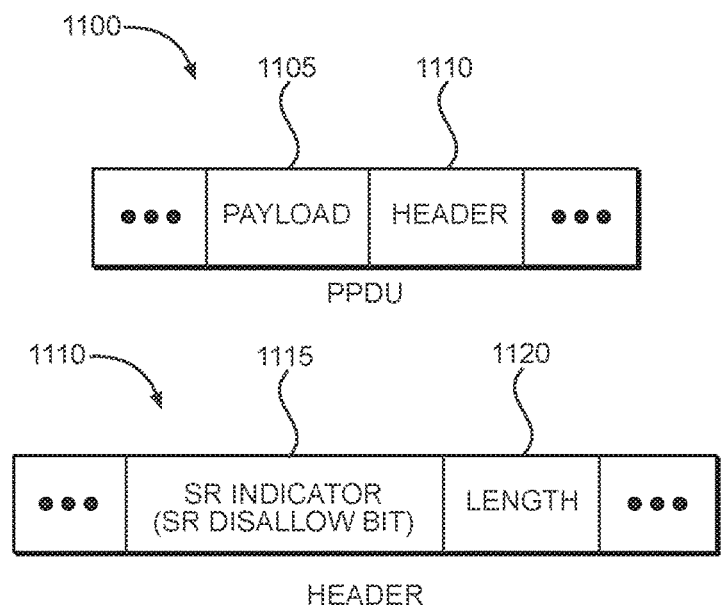
FIG. 11 illustrates an example physical layer convergence procedure (PLCP) protocol data unit (PPDU) in accordance with some embodiments.
Figure 12:
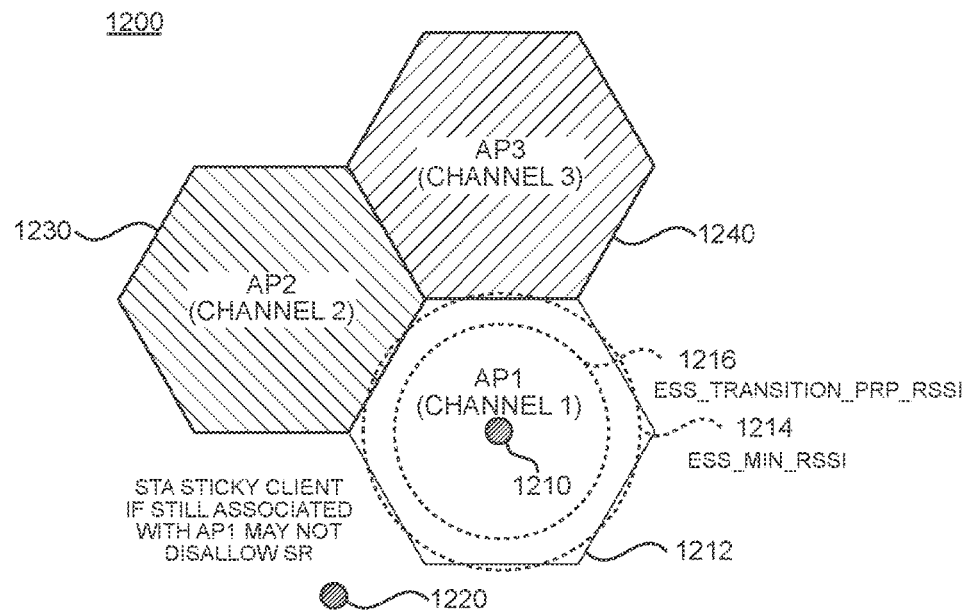
FIG. 12 illustrates another example scenario in which an STA may disallow SR transmissions in accordance with some embodiments.
Figure 13:
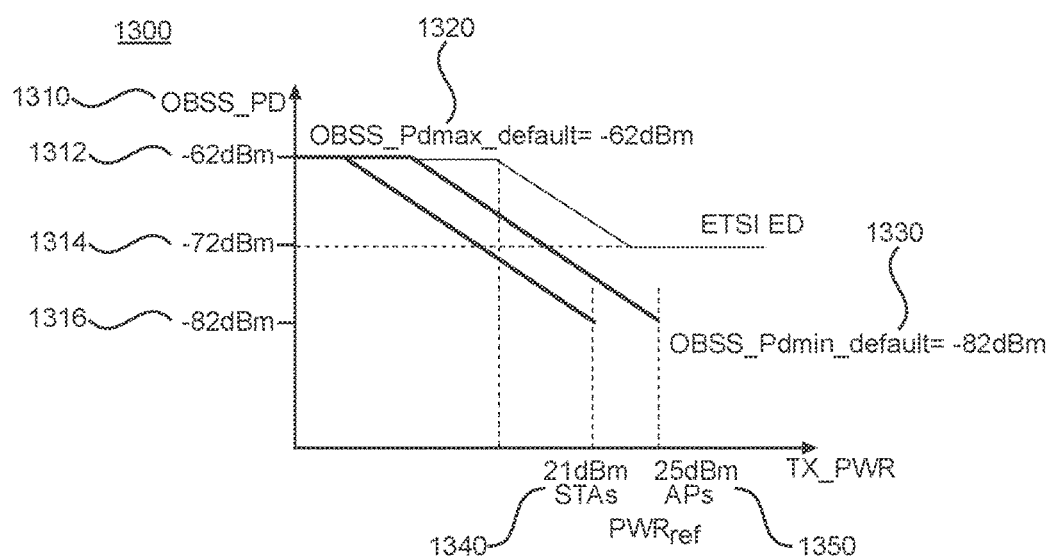
FIG. 13 illustrates an example mapping between transmit power and received overlapping basic service set (OBSS) power in accordance with some embodiments.

FIG. 9 illustrates an example scenario in which an STA may disallow spatial reuse (SR) transmissions in accordance with some embodiments. FIG. 10 illustrates another example scenario in which an STA may disallow spatial reuse (SR) transmissions in accordance with some embodiments. FIG. 11 illustrates an example physical layer convergence procedure (PLCP) protocol data unit (PPDU) in accordance with some embodiments. FIG. 12 illustrates another example scenario in which an STA may disallow SR transmissions in accordance with some embodiments. FIG. 13 illustrates an example mapping between transmit power and received overlapping basic service set (OBSS) power in accordance with some embodiments. It should be noted that the examples shown in FIGS. 9-13 may illustrate some or all of the concepts and techniques described herein in some cases, but embodiments are not limited by the examples of FIGS. 9-13. For instance, embodiments are not limited by the name, number, type, size, ordering, arrangement and/or other aspects of the devices, STAs 103, APs 102, cells, components, networks, functions, mappings, parameters, frames, signals, fields, data blocks, operations, and other elements as shown in FIGS. 9-13. Although some of the elements shown in the examples of FIGS. 9-13 may be included in an 802.11 standard and/or other standard, embodiments are not limited to usage of such elements that are included in standards.

Referring to FIG. 9, in the example scenario 900, the source STA 905 may receive one or more PPDUs from the destination STA 910, as indicated by 920. The source STA 905 may determine an RSSI based on the one or more PPDUs. The source STA 905 may transmit one or more PPDUs to the source STA 905 (as indicated by 925). Another STA 915 (and/or other AP) may receive the one or more PPDUs from the source STA 905, and may determine whether SR transmissions are permissible by the other STA 915 (and/or other AP) concurrently to the transmission 925 in a same channel. The determination may be based on an SR indicator, SR disallow bit and/or other included in the one or more PPDUs, in some embodiments, although the scope of embodiments is not limited in this respect. In this example scenario 900, the other STA 915 may transmit to another STA and/or other AP, as indicated by 935, in accordance with a spatial reuse technique. In addition, if 915 is another AP, the other AP 915 may transmit to another STA at 935. It should be noted that in the example scenario 900, the other STA 915 (and/or other AP) may consider the source STA 905 as an OBSS.

In the example scenario 950, the source STA 955 may receive one or more PPDUs from the first AP 960, as indicated by 970. The source STA 955 may determine an RSSI based on the one or more PPDUs. The source STA 955 may transmit one or more PPDUs to the first AP 960 (as indicated by 975). Another STA 965 may receive the one or more PPDUs from the source STA 955, and may determine whether SR transmissions are permissible by the other STA 965 concurrently to the transmission 975 in a same channel. The determination may be based on an SR indicator, SR disallow bit and/or other included in the one or more PPDUs, in some embodiments, although the scope of embodiments is not limited in this respect. In this example scenario 950, the other STA 965 may transmit to the second AP 967, as indicated by 985, in accordance with a spatial reuse technique. In some embodiments, the first AP 960 and the second AP 967 may operate in different networks. Accordingly, the other STA 965 may consider the source STA 955 as an OBSS STA, in some embodiments.

It should be noted that embodiments are not limited by the example scenarios 900 and 950. In an example, an AP may be used instead of the source STA 905, in some scenarios. In another example, an AP may be used instead of the destination 910. In some cases, the RSSI may be measured at the AP and sent to the source STA 905. In some cases, the RSSI may be determined at the source STA 905. In another example, the source STA 955 and the first AP 960 may be interchanged. Accordingly, the AP may perform a transmission that is used, by the other STA 965, to determine whether SR transmissions are permissible. Other arrangements, in addition to these examples, may be used.

In the example scenario 1000 in FIG. 10, the STA 1020 may be relatively close to the AP 1010. Accordingly, an RSSI determined based on PPDUs exchanged between the STA 1020 and AP 1010 may be high enough that the STA 1020 may not disallow SR transmissions. The STA 1030 may be further away from the AP 1010 than the STA 1020. Accordingly, another RSSI determined based on PPDUs exchanged between the STA 1030 and AP 1010 may be low enough that the STA 1030 may disallow SR transmissions. The circle 1015 may indicate a boundary (or at least a rough boundary) for which STAs within the boundary may not disallow SR transmissions and STAs outside of the boundary may disallow the SR transmissions. It should be noted that the RSSI may be based on more than distance, and whether or not an STA may disallow the SR transmissions may be based on more than the boundary 1015, in some cases.

Referring to FIG. 11, a non-limiting example of a PPDU 1100 is shown. In some embodiments, the PPDU 1100 may be an HE-PPDU, although the scope of embodiments is not limited in this respect. The example PPDU 1100 may include a payload 1105 and/or a header 1110. Additional fields may be included in the PPDU 1100, in some embodiments. The header 1110 may include the SR indicator 1115 (which may be an SR disallow bit, in some cases). The header 1110 may include a length field 1120, in some cases. The header 1110 may include one or more additional fields, in some embodiments.

Referring to the example scenario 1200 in FIG. 12, the STA 1220 may communicate with the AP 1210. If the STA 1220 is located relatively far from the AP 1210, an RSSI determined based on PPDU exchanged between the STA 1220 and AP 1210 may be relatively low, as a result of a handoff not being performed and/or initiated. The STA 1220 may be referred to as a "sticky client" in some cases. In this case, although the RSSI may be relatively low, the STA 1220 may not disallow the SR transmissions. In some cases. STAs in the region between the circles for the thresholds 1214 and 1216 may disallow the SR transmissions, as the RSSI may be between the thresholds 1214 and 1216. However, STAs outside of the circle for threshold 1214 may not disallow SR transmissions, and STAs inside of the circle for threshold 1216 also may not disallow the SR transmissions.

Referring to FIG. 13, an example mapping between transmit power and received overlapping basic service set (OBSS) power is shown. In some embodiments, spatial reuse may be performed, in which the STA 103 may transmit in the presence of a detected OBSS signal/PPDU. A rule, function and/or mapping between a transmit power of an STA 103 and a detected OBSS power may be used, in some cases.

In a non-limiting example, the source STA described in examples and embodiments herein may transmit one or more PPDUs. Another STA may determine a power level (OBSS_PD 1310) and may determine a transmit power for SR transmissions using a mapping such as the one shown in FIG. 13. In addition, an SR indicator may also be used by the other STA, in some embodiments. That is, the other STA may determine whether SR transmissions are permissible by decoding the SR indicator. If SR transmissions are permissible, the other STA may perform SR transmissions using a transmit power that may be determined using a function such as the one shown in FIG. 13. This example is not limiting, as any technique may be used to determine such a transmit power. In addition, a different function may be used, which may be different from the one shown in FIG. 13 in terms of shape, values, slope and/or other characteristics.

Figure 14:
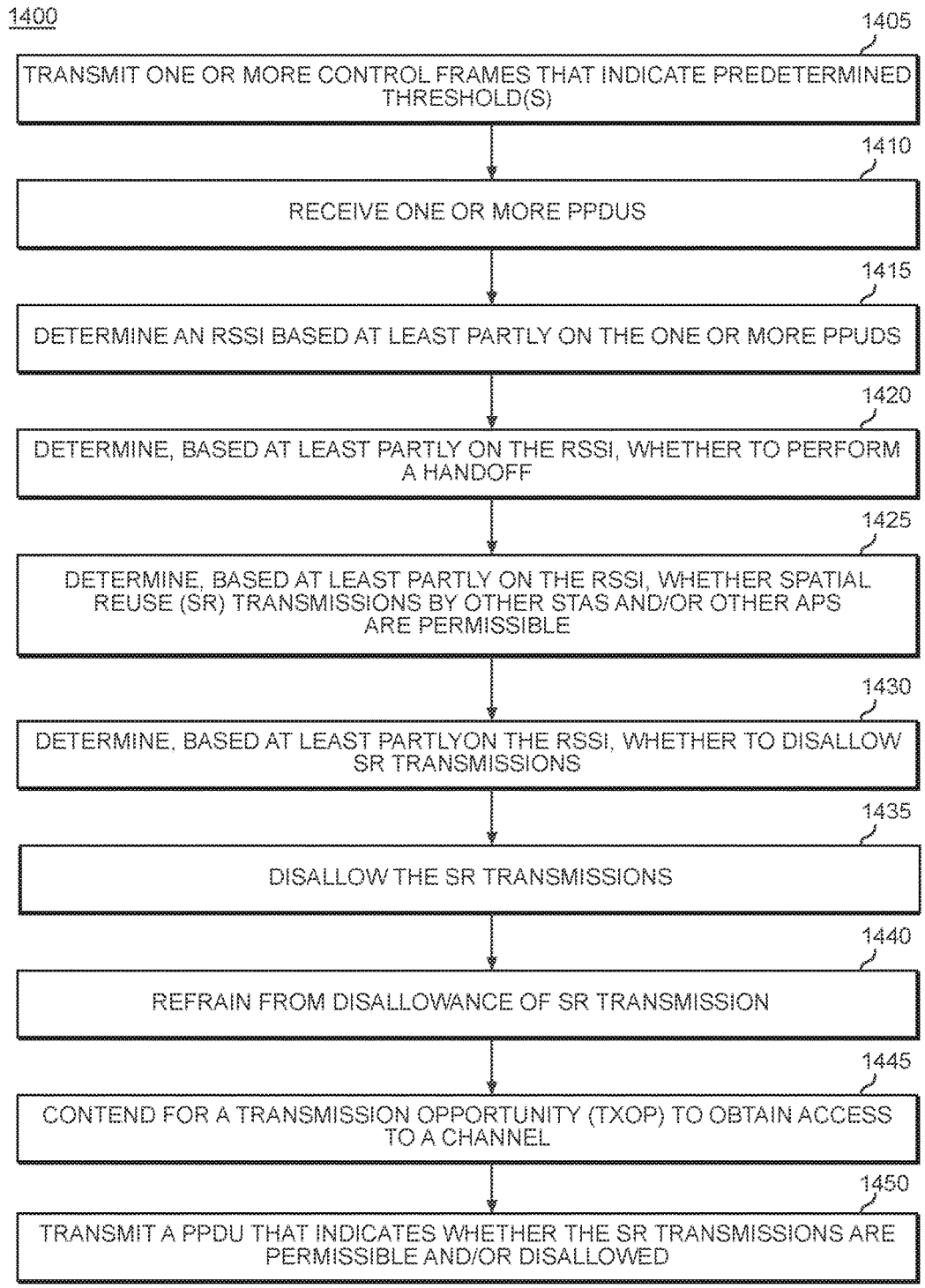
FIG. 14 illustrates the operation of another method of communication in accordance with some embodiments.

FIG. 14 illustrates the operation of another method of communication in accordance with some embodiments. As mentioned previously regarding the method 800, embodiments of the method 1400 may include additional or even fewer operations or processes in comparison to what is illustrated in FIG. 14 and embodiments of the method 1400 are not necessarily limited to the chronological order that is shown in FIG. 14. In describing the method 1400, reference may be made to FIGS. 1-13, although it is understood that the method 1400 may be practiced with any other suitable systems, interfaces and components.

In some embodiments, the AP 102 and/or the STA 103 may be configurable to operate as an HE device 104. Although reference may be made to an AP 102 and/or STA 103 herein, including as part of the descriptions of the method 1200 and/or other methods described herein, it is understood that an HE device 104, AP 102 configurable to operate as an HE device 104 and/or STA 103 configurable to operate as an HE device 104 may be used in some embodiments. In addition, embodiments of the method 1400 may be applicable to APs 102, STAs 103. UEs, eNBs or other wireless or mobile devices. The method 1400 may also be applicable to an apparatus for an AP 102, STA 103 and/or other device described above.

In some embodiments, one or more operations of the method 1400 may be the same as or similar to one or more operations described herein, including but not limited to one or more operations of the method 800. In addition, previous discussion of various techniques and concepts may be applicable to the method 1200 in some cases, including spatial reuse, spatial multiplexing, basic service set (BSS), BSS AP, extended service set (ESS), ESS network, overlapping basic service set (OBSS), OBSS AP, OBSS power, OBSS PPDU, transmit power, RSSI, managed networks, managed APs, unmanaged APs, channel contention, TXOP and/or others. In addition, one or more examples shown in any of FIGS. 1-13 may be applicable, in some cases, although the scope of embodiments is not limited in this respect.

It should be noted that the method 1400 may be practiced by an AP 102 and may include exchanging of elements, such as frames, signals, messages, fields and/or other elements, with an STA 103. Similarly, the method 800 may be practiced at an STA 103 and may include exchanging of such elements with an AP 102. In some cases, operations and techniques described as part of the method 800 may be relevant to the method 1400. In addition, embodiments of the method 1400 may include one or more operations performed at the AP 102 that are reciprocal to or similar to other operations described herein performed at the STA 103. For instance, an operation of the method 1400 may include transmission of a frame by the AP 102 while an operation of the method 800 may include reception of the same message or similar message by the STA 103.

At operation 1405, the AP 102 may transmit one or more control messages. The control message(s) may include broadcast messages that may be received by one or more STAs 103, unicast messages to an STA 103 and/or other types of messages.

In some embodiments, the AP 102 may operate in a network. The one or more control messages may include a handoff threshold that indicates a minimum received signal strength indicator (RSSI) for received PPDUs for STA 103 operation without a handoff to another AP 102 of the network. The one or snore control messages may include additional parameter(s), such as the spatial reuse (SR) threshold previously described and/or other parameter(s), in some embodiments. In some embodiments, the AP may be arranged to operate in accordance with a WLAN protocol. The AP 102 may transmit one or more control frames, management frames, beacon frames and/or other frames to one or more STAs 103. The frame(s) may include one or more parameters such as those transmitted by the AP 102 at operation 1205. Embodiments are not limited to usage of control messages, however, as the parameter(s) may be transmitted in any suitable manner. For instance, the parameter(s) may be included in data packets, PPDs and/or other, in some embodiments.

At operation 1410, the AP 102 may receive one or more PPDUs. In some embodiments, the PPDU(s) may be received from an STA 103, although the scope of embodiments is not limited in this respect.

At operation 1415, the AP 102 may determine a received signal strength indicator (RSSI). In some embodiments, the RSSI may be determined for an STA 103 from which PPDU(s) are received at operation 1410, although the scope of embodiments is not limited in this respect. Previously described techniques for determination of the RSSI and/or other measurements (such as SNR and/or other) may be used although the scope of embodiments is not limited in this respect.

At operation 1420, the AP 102 may determine whether to perform a handoff. In some embodiments, the AP 102 may determine that an STA 103 is to perform and/or initiate a handoff to another AP 102. The determination may be based on one or more thresholds, such as a handoff threshold and/or other. In a non-limiting example, the AP 102 may determine that a handoff is to be performed if the RSSI determined (by the AP 102) for an STA 103 is below the handoff threshold.

At operation 1425, the AP 102 may determine, based at least partly on the RSSI, whether spatial reuse (SR) transmissions by other STAs 103 and/or other APs 102 are permissible. At operation 1430, the AP 102 may determine, based at least partly on the RSSI, whether to disallow SR transmissions. At operation 1435, the AP 102 may disallow the SR transmissions. At operation 1440, the AP 102 may refrain from disallowance of the SR transmissions. In some embodiments, the AP 102 may use same or similar techniques described regarding the method 800, although the scope of embodiments is not limited in this respect.

In a non-limiting example, the AP 102 may determine that the SR transmissions are permissible if the RSSI is greater than or equal to a predetermined threshold. The AP 102 may determine that the SR transmissions are impermissible if the RSSI is less than the threshold.

At operation 1445, the AP 102 may contend for a transmission opportunity (TXOP) to obtain access to a channel. In some embodiments, the AP 102 may contend for a TXOP during which the AP 102 is to control access to the channel. In some embodiments, the AP 102 may contend for a wireless medium during a contention period to receive exclusive control of the medium during a period, including but not limited to a TXOP and/or HE control period. The AP 102 may transmit, receive and/or schedule one or more frames and/or signals during the period. The AP 102 may transmit and/or receive one or more frames and/or signals during the period. However, it should be noted that embodiments are not limited to scheduled transmission/reception or to transmission/reception in accordance with the exclusive control of the medium. Accordingly, an MPDU, PPDU, BA frame and/or other frame may be transmitted/received in contention-based scenarios and/or other scenarios, in some embodiments. Any suitable contention methods, operations and/or techniques may be used, which may or may not be part of a standard. In a non-limiting example, one or more contention methods, operations and/or techniques of an 802.11 standard/protocol and/or W-LAN standard/protocol may be used.

At operation 1450, the AP 102 may transmit a PPDU that may indicates whether the SR transmissions are permissible. The PPDU may be transmitted during the TXOP in the channel, in some cases. It should be noted that the PPDU may be a downlink PPDU transmitted to an STA 103, although the scope of embodiments is not limited in this respect. In addition, the STA 103 may transmit multiple PPDUs during the TXOP, in some cases. One or more of the PPDUs may indicate whether the SR transmissions are permissible. Previously described techniques may be used (such as the SR indicator, SR disallow bit and/or other), although the scope of embodiments is not limited in this respect.

In some embodiments, the AP 102 may transmit a downlink PPDU that includes an SR indicator. A first value of the SR indicator may indicate that the SR transmissions are permissible and a second value of the SR indicator may indicate that the SR transmissions are impermissible. In some embodiments, the SR indicator may include an SR disallow bit that is included in a high-efficiency (HE) signal (HE-SIG) field of the downlink PPDU.

In some cases, performance may be affected by interference generated by STAs 103 performing spatial reuse on top of their transmissions. In some embodiments, an indicator may be included in a transmitted PPDU (including but not limited to a header of the PPDU) which may indicate whether or not other STAs 103 are permitted to perform SR transmissions. In a non-limiting example, an SR disallow bit in the HE SIG-A (preamble of HE PPDUs) may be used to prevent other STAs 103 from performing OBSS_PD-based spatial reuse. In some cases, the indicator (such as the SR disallow bit and/or other) may instruct, notify and/or advise the other STAs 103 whether or not the STAs 103 are to refrain from performance of the SR transmissions. In some cases, the indicator (such as the SR disallow bit and/or other) may permit, forbid and/or restrict the other STAs 103 regarding the SR tranmissions.

In some cases, such an indicator (SR disallow bit and/or other) may be used inefficiently. For instance, the indicator may be abused by STAs 103 that may want protection even if they do not really need it. Overall benefits of spatial reuse may be reduced in such cases. In some embodiments, conditions may be used to determine whether or not STAs 103 are to be allowed to set this SR disallow bit to a value that instructs other STAs 103 to not perform the SR transmissions. Accordingly, the STAs may set the SR disallow field for OBSS_PD-based SR in the HE SIG-A of their transmitted HE PPDUs and may prevent other STAs 103 from performance of spatial reuse, but under one or more conditions.

In a non-limiting example, a source STA 103 may be interfered with if it transmits toward a destination STA 103 that is far away (low SNR). In some embodiments, the source STA 103 may be able to set the SR disallow bit if it transmits toward a source STA 103 for which the most recent PPDU has been received below a threshold (such as an SR_disallow_RSSI threshold and/or other). For instance, the SR_disallow_RSSI threshold may be a value between −72 and −82 dBm, although embodiments are not limited to values in this example range. Any suitable values within or outside of that range may be used.

In another non-limiting example, in managed environments, APs 102 from the same ESS may be deployed with a frequency reuse plan in which the APs 102 may be placed in a manner in which a minimum received RSSI from the closest AP 102 in any point is higher than a specific value (such as ESS_min_RSSI and/or other). This means that if an STA 103 operates below this ESS_min_RSSI, it should connect in another AP 102 from the same ESS. Such an AP 102 may be referred to as a sticky client. In such cases, STAs 103 that operate below this level may not necessarily be operating properly. In an example, such STAs 103 may be restricted from receiving protection from interference by disallowing spatial reuse. Accordingly, such STAs 103 may be restricted from setting the SR disallow bit to a value of 1 (or any value that represents a case in which other STAs 103 are to refrain from performing SR transmissions). In some embodiments, protection against overly aggressive spatial reuse may be realized, and such protection may be restricted and/or limited so that it is not abused by STAs 103.

In some embodiments, a source STA 103 may be allowed to set the SR disallow bit in the HE SIG-A of the HE PPDU that the source STA 103 transmits (or through another way of disallowing spatial reuse). Setting of the SR disallow bit by the source STA 103 may be restricted to cases in which the source STA 103 transmits toward a destination STA 103 from which the source STA 103 has received a PPDU at an RSSI that is below a specific SR_disallow_RSSI threshold. For instance, the source STA 103 may use an RSSI based on a latest received PPDU, one or more PPDUs received during a time period (such as within the last N seconds and/or other time period) and/or other PPDU(s) received from the destination STA 103. Any suitable value may be used for such a threshold, including but not limited to a value in a range of −72 to −82 dBm.

In some embodiments, the source STA 103 may monitor an RSSI received from the destination STA 103. Under some conditions, the source STA 103 may be able to indicate that other STAs 103 are to refrain from SR transmissions (such as by setting of the SR disallow bit in a PPDU to be transmitted by the source STA 103). Such conditions may include, but are not limited to, one or more of the following: if the RSSI of the last (and/or latest) received PPDU with a valid PHY header is below the threshold; if the RSSI of the X last (and/or latest) received PPDUs is, on averaged below the threshold, in which any suitable value of X may be used; if at least one RSSI measurement from the last (and/or latest) X received PPDUs have been received below the threshold; and/or other condition(s).

In some embodiments, if the source STA 103 communicates to an AP 102, then the source STA 103 may use an RSSI received from the AP 102 to check if the source STA 103 may disallow SR transmissions by other STAs 103 or not. For instance, such an RSSI received from the AP 102 may be referred to as an AP_RSSI, in some cases. It should be noted that one or more operations, methods and/or techniques described herein related to communication between the source STA 103 and the destination STA 103 may be used in some cases in which the STA 103 communicates to an AP 102. For instance, the source STA 103 may indicate whether or not other STAs 103 are to refrain from SR transmissions while the source STA 103 transmits a PPDU to the AP 102.

In some embodiments, in managed environments, APs 102 may have been deployed in a manner in which a minimum received RSSI is to be above a threshold (including, but not limited to an ESS_min_RSSI_threshold). If this ESS_min_RSSI threshold is above a SR_min_RSSI threshold, then the source STA 103 may not be able to indicate to other STAs 103 to refrain from SR transmissions. In some cases, an SR indicator field may be used to indicate such information. For instance, the SR disallow bit may be set to a predetermined value (including but not limited to a value of 1) to indicate such information.

In some embodiments, the AP 102 may send to associated STAs 103, a threshold (including but not limited to the ESS_min_RSSI threshold), which may be applicable to the AP 102, to one or more APs 102, to one or more BSS and/or to an entire ESS. For instance, STAs 103 associated to a particular AP 102, BSS and/or ESS may use an ESS_min_RSSI threshold of the particular AP 102, BSS and/or ESS in operations, methods and/or techniques described herein.

In a non-limiting example, the source STA 103 may receive a signal from an AP at an RSSI of AP_RSSI (this value may be communicated by the AP 102, may be measured at the source STA 103 and/or otherwise determined). If the value of AP-RSSI is below the SR_disallow_RSSI_threshold, the source STA 103 may disallow OBSS_PD-based SR (and/or indicate to other STAs 103 to refrain from SR transmissions), unless the value of AP_RSSI is below the ESS_min_threshold. If the value of AP_RSSI is below the ESS_min_threshold, the source STA may not be able to disallow OBSS_PD-based SR (and/or indicate to other STAs 103 to refrain from SR transmissions).

In some embodiments, other information that the AP 102 sends to the STAs 103 may be used. For instance, the AP 102 may send, to its STAs 103, a BSS_transitions_prep_RSSI threshold at which the STA 103 is to prepare for BSS transitions (such as to start performing scanning). This BSS_transitions_prep_RSSI threshold may be higher than the ESS_min_RSSI in some cases, to give time for the STA 103 to perform scanning. In a non-limiting example, the following may be used: if the AP-RSSI is below the SR_disallow_RSSI threshold, the source STA 103 may disallow OBSS_PD-based SR (and/or indicate that other STAs 103 are to refrain from SR transmissions), unless the AP_RSSI is at least X dB below the BSS_transitions_prep_RSSI, in which X may be any suitable value, including but not limited to a value in a range of 5-10 dB. If the AP_RSSI is at least X dB below BSS_transitions_prep_RSSI, the source STA 103 may not be able to disallow OBSS_PD-based SR (and/or indicate that other STAs 103 are to refrain from SR transmissions).

In some embodiments, an OBSS_PD allow/disallow field, and/or similar field, may be used. In a non-limiting example, the field may be included in a spatial reuse information element (IE). In some cases, this field may indicate that source STAs 103 may not disallow SR transmissions (and/or may not indicate that other STAs 103 are to refrain from SR transmissions) regardless of RSSI measurements. For instance, in such cases, STAs 103 that receive this indication from their associated AP 102 may allow SR transmissions and may not disallow them (this may overrules the specification rules, in some cases). In some cases, this field may indicate that the source STA 103 may disallow SR transmissions (and/or may not indicate that other STAs 103 are to refrain from SR transmissions) according to one or more conditions included in a specification (that is, no specific modifications of the spec rides in some cases).

In some embodiments, another solution (or complementary solution) is to define this OBSS_PD-based SR field to be available for (and in some cases, restricted to) HE extended range PPDUs. SR disallow may be possible when transmitting HE extended range PPDUs.

In Example 1, an apparatus of a station (STA) may comprise memory. The apparatus may further comprise processing circuitry. The processing circuitry may be configured to determine a received signal strength indicator (RSSI) based on one or more inbound physical layer convergence procedure (PLCP) protocol data units (PPDUs) received at the STA in a channel. The processing circuitry may be further configured to contend for a transmission opportunity (TXOP) to obtain access to the channel. The processing circuitry may be further configured to determine, based at least partly on a comparison between the RSSI and a predetermined threshold, whether spatial reuse (SR) transmissions are permissible. The SR transmissions may be concurrent to transmissions by the STA within the TXOP in the channel. The processing circuitry may be further configured to encode, for transmission in the channel during the TXOP, an outbound PPDU that includes an SR indicator. A first value of the SR indicator may indicate that the SR transmissions are permissible and a second value of the SR indicator may indicate that the SR transmissions are impermissible.

In Example 2, the subject matter of Example 1, wherein the processing circuitry may be further configured to determine that the SR transmissions are permissible if the RSSI is greater than or equal to the threshold. The processing circuitry may be further configured to determine that the SR transmissions are impermissible if the RSSI is less than the threshold.

In Example 3, the subject matter of one or any combination of Examples 1-2, wherein the processing circuitry may be further configured to determine the RSSI based on an average signal strength of the latest inbound PPDU received at the STA.

In Example 4, the subject matter of one or any combination of Examples 1-3, wherein the processing circuitry may be further configured to determine per-PPDU average signal strengths of the one or more inbound PPDUs. The processing circuitry may be further configured to determine the RSSI based on an average of the per-PPDU average signal strengths.

In Example 5, the subject matter of one or any combination of Examples 1-4, wherein the processing circuitry may be further configured to determine per-PPDU average signal strengths of the one or more inbound PPDUs. The processing circuitry may be further configured to determine the RSSI based on a minimum of the per-PPDU average signal strengths.

In Example 6, the subject matter of one or any combination of Examples 1-5, wherein if the RSSI is greater than or equal to the threshold, the SR indicator may be restricted to the first value.

In Example 7, the subject matter of one or any combination of Examples 1-6, wherein the STA may be arranged to operate in accordance with a wireless local area network (WLAN) protocol. The threshold may be an SR disallow RSSI threshold. The SR indicator may include an SR disallow bit that is included in a high-efficiency (HE) signal (HE-SIG) field of the outbound PPDU.

In Example 8, the subject matter of one or any combination of Examples 1-7, wherein the STA may be arranged to operate in accordance with a wireless local area network (WLAN) protocol. The one or more inbound PPDUs may be received at the STA from a first access point (AP). The SR transmissions may include overlapping basic service set (OBSS) SR transmissions by one or more other STAs of a second AP.

In Example 9, the subject matter of one or any combination of Examples 1-8, wherein the one or more inbound PPDUs may be received at the STA from a destination STA. The outbound PPDU may be encoded for transmission to the destination STA.

In Example 10, the subject matter of one or any combination of Examples 1-9, wherein the outbound PPDU may include a length field that indicates a length of a transmission period over which the outbound PPDU is to be transmitted. The first value of the SR indicator may indicate that the SR transmissions are permissible during the transmission period. The second value of the SR indicator may indicate that the SR transmissions are impermissible during the transmission period.

In Example 11, the subject matter of one or any combination of Examples 1-10, wherein the memory may be configurable to store the threshold.

In Example 12, the subject matter of one or any combination of Examples 1-11, wherein the processing circuitry may include a baseband processor to determine the RSSI, to determine whether the SR transmissions are permissible, and to encode the outbound PPDU.

In Example 13, the subject matter of one or any combination of Examples 1-12, wherein the apparatus may further include a transceiver to receive the one or more inbound PPDUs and to transmit the outbound PPDU.

In Example 14, a non-transitory computer-readable storage medium may store instructions for execution by one or more processors to perform operations for communication by a station (STA). The operations may configure the one or more processors to decode, from an access point (AP) of a network, a predetermined handoff threshold that indicates a minimum received signal strength indicator (RSSI) for received PPDUs for STA operation without a handoff to another AP of the network. The operations may further configure the one or more processors to determine a received signal strength indicator (RSSI) based on one or more downlink physical layer convergence procedure (PLCP) protocol data units (PPDUs) from the AP. The operations may further configure the one or more processors to contend for a transmission opportunity (TXOP) to obtain access to a channel. The operations may further configure the one or more processors to compare the RSSI to the handoff threshold and to a predetermined spatial reuse (SR) threshold. The operations may further configure the one or more processors to, if the RSSI is greater than or equal to the handoff threshold and less than the SR threshold, disallow SR transmissions in the channel during the TXOP. The operations may further configure the one or more processors to, if the RSSI is less than the handoff threshold or greater than or equal to the SR threshold, allow the SR transmissions.

In Example 15, the subject matter of Example 14, wherein the operations may further configure the one or more processors to encode, for transmission in the channel during the TXOP, an uplink PPDU that includes an SR indicator that indicates whether the SR transmissions are disallowed or allowed.

In Example 16, the subject matter of one or any combination of Examples 14-15, wherein the STA may be arranged to operate in accordance with a wireless local area network (WLAN) protocol. The SR transmissions may include overlapping basic service set (OBSS) SR transmissions by one or more other STAs external to the network.

In Example 17, the subject matter of one or any combination of Examples 14-16, wherein the STA may be arranged to operate in accordance with a wireless local area network (WLAN) protocol. The handoff threshold may be an extended service set (ESS) minimum threshold. The SR threshold may be an SR disallow RSSI threshold. The SR indicator may include an SR disallow bit that is included in a high-efficiency (HE) signal (HE-SIG) field of the outbound PPDU.

In Example 18, the subject matter of one or any combination of Examples 14-17, wherein the determination of the RSSI may include a decoding of a message, from the AP, that includes the RSSI.

In Example 19, the subject matter of one or any combination of Examples 14-18, wherein the RSSI may be determined based on an average signal strength of the one or more downlink PPDUs.

In Example 20, a method of communication at a station (STA) may comprise determining a received signal strength indicator (RSSI) based on one or more inbound physical layer convergence procedure (PLCP) protocol data units (PPDUs) received at the STA. The method may further comprise contending for a transmission opportunity (TOXP) to obtain access to a channel. The method may further comprise determining, based at least partly on a comparison between the RSSI and a predetermined threshold, whether spatial reuse (SR) transmissions by other STAs in the channel during the TXOP are allowed or disallowed. The method may further comprise encoding, for transmission in the channel during the TXOP, an outbound PPDU that includes an SR indicator. A first value of the SR indicator may indicate that the SR transmissions are allowed and a second value of the SR indicator may indicate that the SR transmissions are disallowed.

In Example 21, the subject matter of Example 20, wherein the method may further comprise determining that the SR transmissions are allowed if the RSSI is greater than or equal to the threshold. The method may further comprise determining that the SR transmissions are disallowed if the RSSI is less than the threshold.

In Example 22, an apparatus of an access point (AP) may comprise memory. The apparatus may further comprise processing circuitry. The processing circuitry may be configured to encode, for transmission to a station (STA), a handoff threshold that indicates a minimum received signal strength indicator (RSSI) for received PPDUs for STA operation without a handoff to another AP of the network. The processing circuitry may be further configured to determine a received signal strength indicator (RSSI) for the STA based on one or more uplink physical layer convergence procedure (PLCP) protocol data units (PPDUs) from the STA. The processing circuitry may be further configured to contend for a transmission opportunity (TXOP) to obtain access to a channel. The processing circuitry may be further configured to determine, based at least partly on a comparison between the RSSI and a predetermined threshold, whether spatial reuse (SR) transmissions by other APs and other STAs in the channel during the TXOP are permissible. The processing circuitry may be further configured to encode, for transmission to the STA in the channel during the TXOP, a downlink PPDU that includes an SR indicator. A first value of the SR indicator may indicate that the SR transmissions are permissible and a second value of the SR indicator may indicate that the SR transmissions are impermissible.

In Example 23, the subject matter of Example 22, wherein the processing circuitry may be further configured to determine that the SR transmissions are permissible if the RSSI is greater than or equal to the threshold. The processing circuitry may be further configured to determine that the SR transmissions are impermissible if the RSSI is less than the threshold.

In Example 24, the subject matter of one or any combination of Examples 22-23, wherein the AP may be arranged to operate in accordance with a wireless local area network (WLAN) protocol. The threshold may be an SR disallow RSSI threshold. The SR indicator may include an SR disallow bit that is included in a high-efficiency (HE) signal (HE-SIG) field of the downlink PPDU.

In Example 25, an apparatus of a station (STA) may comprise means for decoding, from an access point (AP) of a network, a predetermined handoff threshold that indicates a minimum received signal strength indicator (RSSI) for received PPDUs for STA operation without a handoff to another AP of the network. The apparatus may further comprise means for determining a received signal strength indicator (RSSI) based on one or more downlink physical layer convergence procedure (PLCP) protocol data units (PPDUs) from the AP. The apparatus may further comprise means for contending for a transmission opportunity (TXOP) to obtain access to a channel. The apparatus may further comprise means for comparing the RSSI to the handoff threshold and to a predetermined spatial reuse (SR) threshold. The apparatus may further comprise means for, if the RSSI is greater than or equal to the handoff threshold and less than the SR threshold, disallowing SR transmissions in the channel during the TXOP. The apparatus may further comprise means for, if the RSSI is less than the handoff threshold or greater than or equal to the SR threshold, allowing the SR transmissions.

In Example 26, the subject matter of Example 25, wherein the apparatus may further comprise means for encoding, for transmission in the channel during the TXOP, an uplink PPDU that includes an SR indicator that indicates whether the SR transmissions are disallowed or allowed.

In Example 27, the subject matter of one or any combination of Examples 25-26, wherein the STA may be arranged to operate in accordance with a wireless local area network (WLAN) protocol. The SR transmissions may include overlapping basic service set (OBSS) SR transmissions by one or more other STAs external to the network.

In Example 28, the subject matter of one or any combination of Examples 25-27, wherein the STA may be arranged to operate in accordance with a wireless local area network (WLAN) protocol. The handoff threshold may be an extended service set (ESS) minimum threshold. The SR threshold may be an SR disallow RSSI threshold. The SR indicator may include an SR disallow bit that is included in a high-efficiency (HE) signal (HE-SIG) field of the outbound PPDU.

In Example 29, the subject matter of one or any combination of Examples 25-28, wherein the means for determining the RSSI may include means for decoding of a message, from the AP, that includes the RSSI.

In Example 30, the subject matter of one or any combination of Examples 25-29, wherein the RSSI may be determined based on an average signal strength of the one or more downlink PPDUs.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a first station (STA), the apparatus comprising: memory; and
  processing circuitry, configured to:
    determine a received signal strength indicator (RSSI) based on one or more inbound physical layer convergence procedure (PLCP) protocol data units (PPDUs) received at the first STA in a channel;
    contend for a transmission opportunity (TXOP) to obtain access to the channel;
    determine, based at least partly on a comparison between the RSSI of the one or more inbound PPDUs received at the first STA and a predetermined threshold, whether spatial reuse (SR) transmissions by one or more second STAs are permissible, the SR transmissions by the one or more second STAs at least partially concurrent to transmissions by the first STA within the TXOP in the channel; and
    encode, for transmission in the channel during the TXOP, an outbound PPDU that includes an SR indicator that is based on the comparison, wherein a first value of the SR indicator indicates that the SR transmissions by the one or more second STAs at least partially concurrent with transmission of the outbound PPDU by the first STA are permissible and a second value of the SR indicator indicates that the SR transmissions by the one or more second STAs at least partially concurrent with transmission of the outbound PPDU by the first STA are impermissible.

2. The apparatus according to claim 1, the processing circuitry further configured to:
  determine that the SR transmissions are permissible if the RSSI is greater than or equal to the threshold; and
  determine that the SR transmissions are impermissible if the RSSI is less than the threshold.

3. The apparatus according to claim 2, the processing circuitry further configured to:
  determine the RSSI based on an average signal strength of the latest inbound PPDU received at the first STA.

4. The apparatus according to claim 2, the processing circuitry further configured to:
  determine per-PPDU average signal strengths of the one or more inbound PPDUs; and
  determine the RSSI based on an average of the per-PPDU average signal strengths.

5. The apparatus according to claim 2, the processing circuitry further configured to:
  determine per-PPDU average signal strengths of the one or more inbound PPDUs; and
  determine the RSSI based on a minimum of the per-PPDU average signal strengths.

6. The apparatus according to claim 1, wherein if the RSSI is greater than or equal to the threshold, the SR indicator is restricted to the first value.

7. The apparatus according to claim 1, wherein:
  the first STA is arranged to operate in accordance with a wireless local area network (WLAN) protocol,
  the threshold is an SR disallow RSSI threshold, and
  the SR indicator includes an SR disallow bit that is included in a high-efficiency (HE) signal (HE-SIG) field of the outbound PPDU.

8. The apparatus according to claim 1, wherein:
  the first STA is arranged to operate in accordance with a wireless local area network (WLAN) protocol,
  the one or more inbound PPDUs are received at the first STA from a first access point (AP),
  the SR transmissions include overlapping basic service set (OBSS) SR transmissions by one or more other STAs of a second AP.

9. The apparatus according to claim 1, wherein:
  the one or more inbound PPDUs are received at the first STA from a destination STA,
  the outbound PPDU is encoded for transmission to the destination STA.

10. The apparatus according to claim 1, wherein:
  the outbound PPDU includes a length field that indicates a length of a transmission period over which the outbound PPDU is to be transmitted,
  the first value of the SR indicator indicates that the SR transmissions are permissible during the transmission period, and
  the second value of the SR indicator indicates that the SR transmissions are impermissible during the transmission period.

11. The apparatus according to claim 1, wherein the memory is configurable to store the threshold.

12. The apparatus according to claim 1, wherein the processing circuitry includes a baseband processor to determine the RSSI, to determine whether the SR transmissions are permissible, and to encode the outbound PPDU.

13. The apparatus according to claim 1, wherein the apparatus further includes a transceiver to receive the one or more inbound PPDUs and to transmit the outbound PPDU.

14. A method of communication at a station (STA), the method comprising:
  determining a received signal strength indicator (RSSI) based on one or more inbound physical layer convergence procedure (PLCP) protocol data units (PPDUs) received at the STA;
  contending for a transmission opportunity (TXOP) to obtain access to a channel;
  determining, based at least partly on a comparison between the RSSI of the one or more inbound PPDUs received at the STA and a predetermined threshold, whether spatial reuse (SR) transmissions by one or more other STAs in the channel during the TXOP are allowed or disallowed; and
  encoding, for transmission in the channel during the TXOP, an outbound PPM that includes an SR indicator based on the comparison, wherein a first value of the SR indicator indicates that the SR transmissions by the one or more other STAs are allowed and a second value of the SR indicator indicates that the SR transmissions by the one or more other STAs are disallowed.

15. The method according to claim 14, further comprising:
  determining that the SR transmissions are allowed if the RSSI is greater than or equal to the threshold; and determining that the SR transmissions are disallowed if the RSSI is less than the threshold.

16. An apparatus of an access point (AP), the apparatus comprising: memory; and processing circuitry, configured to:
   encode, for transmission to a station (STA), a handoff threshold that indicates a minimum received signal strength indicator (RSSI) for received PPDUs for STA operation without a handoff to another AP of the network;
   determine a received signal strength indicator (RSSI) for the STA based on one or more uplink physical layer convergence procedure (PLCP) protocol data units (PPDUs) received by the AP from the STA;
   contend for a transmission opportunity (TXOP) to obtain access to a channel;
   determine, based at least partly on a comparison between the RSSI of the one or more uplink PPDUs received by the AP and a predetermined threshold, whether spatial reuse (SR) transmissions by one or more other devices in the channel during the TXOP are permissible; and
   encode, for transmission to the STA in the channel during the TXOP, a downlink PPDU that includes an SR indicator that is based on the comparison, wherein a first value of the SR indicator indicates that the SR transmissions by the one or more other devices are permissible and a second value of the SR indicator indicates that the SR transmissions by the one or more other devices are impermissible.

17. The apparatus according to claim 16, the processing circuitry further configured to:
   determine that the SR transmissions are permissible if the RSSI is greater than or equal to the threshold; and
   determine that the SR transmissions are impermissible if the RSSI is less than the threshold.

18. The apparatus according to claim 16, wherein:
   the AP is arranged to operate in accordance with a wireless local area network (WLAN) protocol,
   the threshold is an SR disallow RSSI threshold, and
   the SR indicator includes an SR disallow bit that is included in a high-efficiency (HE) signal (HE-SIG) field of the downlink PPDU.

* * * * *

UNITED STATES PATENT AND TRADEMARK OFFICE
CERTIFICATE OF CORRECTION

PATENT NO. : 10,368,285 B2
APPLICATION NO. : 15/468368
DATED : July 30, 2019
INVENTOR(S) : Cariou et al.

Page 1 of 1

It is certified that error appears in the above-identified patent and that said Letters Patent is hereby corrected as shown below:

In the Claims

In Column 36, Line 17, in Claim 8, delete "(©BSS)" and insert --(OBSS)-- therefor In Column 36, Line 58, in Claim 14, delete "PPM" and insert --PPDU-- therefor Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*